(12) United States Patent
Geerlings et al.

(10) Patent No.: US 10,185,198 B2
(45) Date of Patent: Jan. 22, 2019

(54) SECOND SURFACE LASER ABLATION

(71) Applicant: Gentex Corporation, Zeeland, MI (US)

(72) Inventors: Kurtis L. Geerlings, Zeeland, MI (US);
George A. Neuman, Holland, MI (US);
John S. Anderson, Holland, MI (US);
Chad M. Wine, Grand Rapids, MI
(US); Henry A. Luten, Holland, MI
(US); Donald L. Bareman, Zeeland,
MI (US)

(73) Assignee: GENTEX CORPORATION, Zeeland,
MI (US)

( * ) Notice: Subject to any disclaimer, the term of this
patent is extended or adjusted under 35
U.S.C. 154(b) by 0 days.

(21) Appl. No.: 15/186,164

(22) Filed: Jun. 17, 2016

(65) Prior Publication Data

US 2016/0370680 A1 Dec. 22, 2016

Related U.S. Application Data

(60) Provisional application No. 62/182,105, filed on Jun. 19, 2015.

(51) Int. Cl.
*G02F 1/155* (2006.01)
*B23K 26/402* (2014.01)
(Continued)

(52) U.S. Cl.
CPC ............ *G02F 1/155* (2013.01); *B23K 26/066* (2015.10); *B23K 26/36* (2013.01);
(Continued)

(58) Field of Classification Search
CPC ..... G02F 1/155; G02F 1/13439; B60R 1/088; B23K 26/066; B23K 26/36; B23K 26/402; B23K 2203/172
(Continued)

(56) References Cited

U.S. PATENT DOCUMENTS 5,501,944 A 3/1996 Hill et al.
5,668,663 A 9/1997 Varaprasad et al.
(Continued)

FOREIGN PATENT DOCUMENTS

CA 2644218 A1 9/2007
CN 1648715 A 8/2005
(Continued)

OTHER PUBLICATIONS

International Search Report and Written Opinion for PCT/US2016/038199 dated Sep. 30, 2016 (17 pages).
(Continued)

*Primary Examiner* — Jack Dinh
(74) *Attorney, Agent, or Firm* — Foley & Lardner LLP; Bradley D. Johnson

(57) ABSTRACT

A laser ablated product exhibits a diffraction severity of less than about 5. The product may include a substrate that is at least partially transparent to visible light, and a periodic structure formed on at least one surface of the substrate by laser ablation. The periodic structure has a period in at least one direction of at least about 4,500 nm to at most about 850,000 nm, and the periodic structure has a peak-to-valley dimension of less than about 25 nm. The product may be employed in an electrochromic device, such as a vehicle rearview mirror assembly.

16 Claims, 19 Drawing Sheets

(51) Int. Cl.
*B23K 26/066* (2014.01)
*B23K 26/36* (2014.01)
*B60R 1/08* (2006.01)
*G02F 1/1343* (2006.01)
*B23K 103/00* (2006.01)
*B23K 103/16* (2006.01)

(52) U.S. Cl.
CPC .... *B23K 2103/172* (2018.08); *B23K 2103/54* (2018.08); *G02F 1/13439* (2013.01)

(58) Field of Classification Search
USPC ........................................................ 359/267
See application file for complete search history.

(56) References Cited

U.S. PATENT DOCUMENTS

| | | |
|---|---|---|
| 8,842,358 B2 | 9/2014 | Bareman et al. |
| 8,927,069 B1 | 1/2015 | Estinto et al. |
| 2002/0044271 A1 | 4/2002 | Leigh-Jones et al. |
| 2003/0058986 A1 | 3/2003 | Oshino et al. |
| 2004/0031778 A1 | 2/2004 | Koyama et al. |
| 2005/0231105 A1 | 10/2005 | Lovell et al. |
| 2006/0020092 A1 | 1/2006 | Chikusa et al. |
| 2010/0132988 A1 | 6/2010 | Valentin et al. |
| 2011/0017280 A1 | 1/2011 | Rumsby |
| 2011/0017602 A1 | 1/2011 | Khosla |
| 2012/0200007 A1 | 8/2012 | Straw et al. |
| 2012/0229882 A1 | 9/2012 | Fish et al. |
| 2013/0020297 A1 | 1/2013 | Gupta et al. |
| 2013/0081951 A1 | 4/2013 | Hankey et al. |
| 2013/0153428 A1 | 6/2013 | Akana et al. |
| 2013/0248837 A1 | 9/2013 | Yokoyama |
| 2014/0036338 A1 | 2/2014 | Bareman et al. |

FOREIGN PATENT DOCUMENTS

| | | |
|---|---|---|
| EP | 1 503 906 B1 | 11/2011 |
| GB | 0 896 934 A | 5/1962 |
| RU | 2287414 C1 | 11/2006 |
| RU | 2390425 C1 | 5/2010 |
| TW | 201325798 A | 7/2013 |
| WO | WO-2008/119949 A1 | 10/2008 |
| WO | WO-2013/090209 A1 | 6/2013 |
| WO | WO-2014/060203 | 4/2014 |
| WO | WO-2014/060203 A1 | 4/2014 |

OTHER PUBLICATIONS

Extended European Search Report in EP15846699.5 dated Sep. 25, 2017 (10 pages).
Extended European Search Report issued in corresponding European Patent Application No. 15828028.9, dated Apr. 3, 2018.
International Search Report and Written Opinion for PCT/US2015/042754 (8 pages).
International Search Report and Written Opinion in PCT/US2015/053850 dated Dec. 18, 2015 (10 pages).
U.S. Notice of Allowance on U.S. Appl. No. 14/874,263 dated Oct. 5, 2017.
U.S. Office Action on U.S. Appl. No. 14/874,263 dated Jan. 12, 2017.
U.S. Office Action on U.S. Appl. No. 14/874,263 dated Jul. 13, 2017.
Extended European Search Report in EP16812567.2 dated May 7, 2018(10 pages).
International Preliminary Report on Patentability issued in PCT/US2016/038199 dated Dec. 19, 2017.
Office Action issued in CN2015800539895 dated Jan. 10, 2018 (21 pgs. inc. translation).
International Search Report issued in PCT/IB2018/052220 dated Jul. 12, 2018.

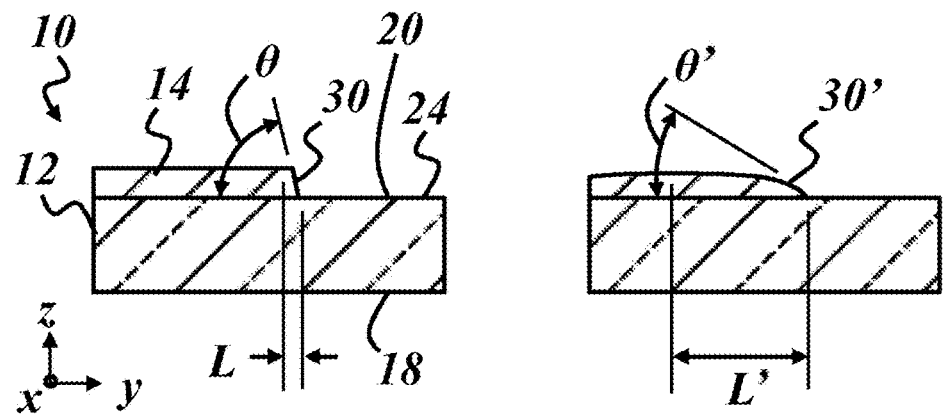
FIG. 3A    FIG. 3B
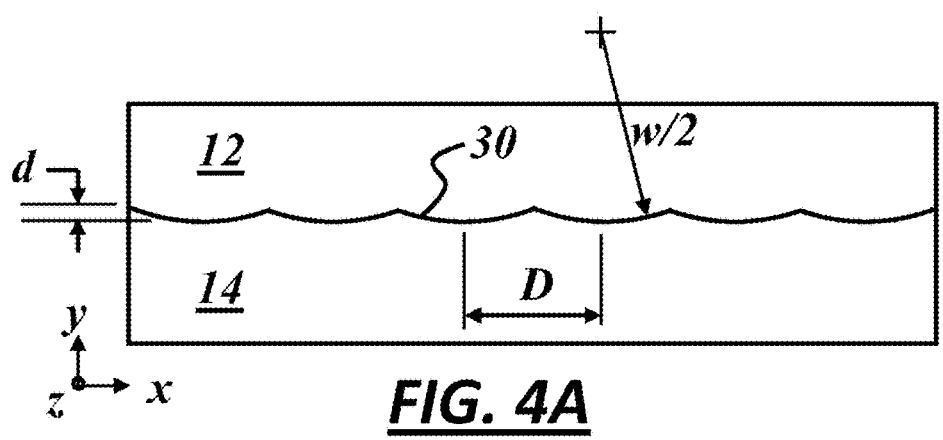
FIG. 4A
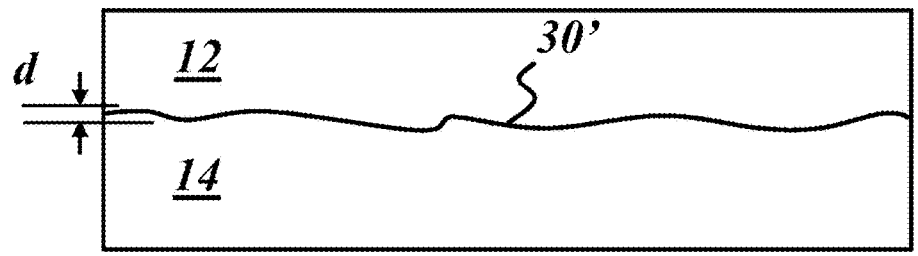
FIG. 4B

SECOND SURFACE LASER ABLATION

CROSS-REFERENCE TO RELATED PATENT APPLICATIONS

This application claims priority from U.S. Provisional Patent Application 62/182,105, filed Jun. 19, 2015, incorporated herein by reference in its entirety.

TECHNICAL FIELD

The present disclosure generally relates to laser ablation processes and products produced thereby.

SUMMARY OF THE INVENTION

One embodiment of the invention relates a product. The product includes a first substrate that is at least partially transparent to visible light; a conductive layer disposed over the first substrate; and an ablated surface on the conductive layer. The ablated surface is formed by subjecting the conductive layer to laser ablation, and the ablated surface comprises a periodic structure. The periodic structure has a period in at least one direction of at least about 4,500 nm to at most about 850,000 nm, and the periodic structure has a peak-to-valley dimension of less than about 25 nm. The periodic structure may have a peak-to-valley dimension of less than about 15 nm. The periodic structure may have a period in a laser ablation process direction of at least about 4,500 nm to at most about 850,000 nm. The periodic structure may have a period in a laser ablation offset direction of at least about 4,500 nm to at most about 850,000 nm. The product may have a diffraction severity of less than about 5. The substrate may include glass. The product may additionally include a material in contact with the periodic structure, wherein the material has a refractive index greater than 1, and a difference between the refractive index of the material and a refractive index of the conductive layer is less than 0.5.

Another embodiment of the invention relates to an electrochromic device. The electrochromic device includes a product including a first substrate that is at least partially transparent to visible light; a conductive layer disposed over the first substrate; and an ablated surface on the conductive layer. The ablated surface is formed by subjecting the conductive layer to laser ablation, the ablated surface comprises a periodic structure, the periodic structure has a period in at least one direction of at least about 4,500 nm to at most about 850,000 nm, and the periodic structure has a peak-to-valley dimension of less than about 25 nm. The electrochromic device includes a second substrate having a second surface that opposes the first substrate, the first and second substrates forming a cavity between the first substrate and the second substrate. The electrochromic device includes an electrochromic fluid disposed in the cavity. At least one of the ablated surface and the second surface is adjacent the cavity, and at least one conductive layer is adjacent the cavity. The electrochromic device may be a part of a vehicle rearview mirror assembly. The electrochromic fluid may have a refractive index greater than 1. The conductive layer may include indium tin oxide. The electrochromic device may additionally include a coating layer disposed on a portion of the conductive layer. The coating layer may include a multilayer structure comprising a first chrome layer, a first ruthenium layer, a second chrome layer, and a second ruthenium layer. The electrochromic device may have a diffraction severity is less than about 5, and the peak-to-valley dimension is less than about 15 nm. The diffraction severity may be less than about 2.5.

Another embodiment of the invention relates to a product. The product may include a first substrate that is at least partially transparent to visible light; a conductive layer disposed over the first substrate; and an ablated surface on the conductive layer. The ablated surface is formed by subjecting the conductive layer to laser ablation, the ablated surface comprises a periodic structure, and the product has a diffraction severity of less than about 5. The product may have a diffraction severity of less than about 2.5. The product may have a diffraction severity of less than about 1.5. The periodic structure may have a peak-to-valley dimension of less than about 25 nm. The periodic structure may have a period in at least one direction of at least about 4,500 nm to at most about 850,000 nm. The product may additionally include a coating layer disposed on a portion of the conductive layer. The product may additionally include a material in contact with the periodic structure, wherein the material has a refractive index greater than 1.

Another embodiment of the invention relates to an electrochromic device. The electrochromic device includes a product including a first substrate that is at least partially transparent to visible light; a conductive layer disposed over the first substrate; and an ablated surface on the conductive layer. The ablated surface is formed by subjecting the conductive layer to laser ablation, the ablated surface comprises a periodic structure, and the product has a diffraction severity of less than about 5. The electrochromic device includes a second substrate having a second surface that opposes the first substrate, and the first and second substrates form a cavity between the first substrate and the second substrate. The electrochromic device includes an electrochromic fluid disposed in the cavity. At least one of the ablated surface and the second surface is adjacent the cavity, and at least one conductive layer is adjacent the cavity. The electrochromic device may be a part of a vehicle rearview mirror assembly. The electrochromic fluid may have a refractive index greater than 1.

BRIEF DESCRIPTION OF THE DRAWINGS

Illustrative embodiments will hereinafter be described in conjunction with the appended drawings, wherein like designations denote like elements.

FIG. 3A is a cross-sectional view of a processed edge of a laser ablated coating layer.

FIG. 3B is a cross-sectional view of an edge of a coating formed by masking in a material addition process.

FIG. 4A is a top view of the processed edge of the laser ablated coating layer.

FIG. 4B is a top view of the edge of the coating formed by masking in the material addition process.

DETAILED DESCRIPTION

Figure 1:
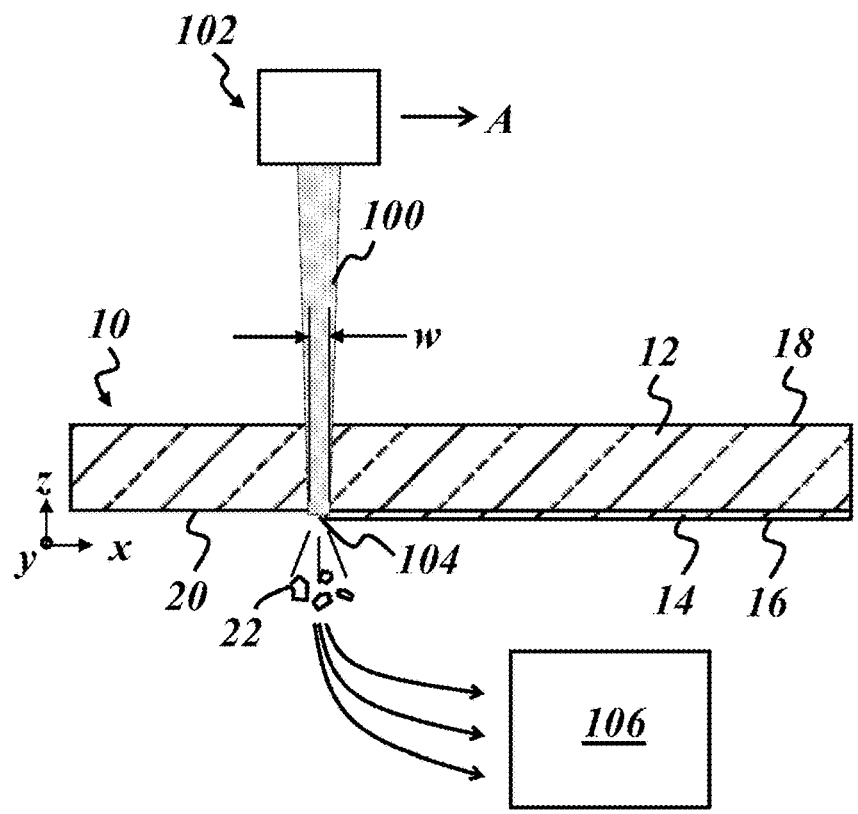
FIG. 1 is a side cross-sectional view of an embodiment of a second surface laser ablation process.

A laser ablation process generally includes selective removal of material at a surface of a workpiece by directing a laser beam at the workpiece. The laser beam is configured to deliver a controlled amount of energy at a laser spot defined where the beam impinges the desired surface. This controlled amount of energy is selected to liquefy, vaporize, or otherwise rapidly expand the surface material at the laser spot to cause it to separate from the workpiece for removal. Laser ablation can be used to remove at least a portion of one or more coatings from a coated substrate, for example, or to otherwise reshape the workpiece surface.

The laser ablation process may produce artifacts on the workpiece surface that create an undesired diffraction pattern when light is shone on or through the ablated surface. The diffraction effect is produced by artifacts with a periodic arrangement which are formed on the ablated surface. In some cases, the diffraction effect may be present but exhibit a severity that is not objectionable. An objectionable diffraction effect is defined as exhibiting a diffraction severity of greater than 5. The manner in which the diffraction severity is quantitatively measured is described in detail below. In some embodiments, the laser ablated workpiece may desirably exhibit a diffraction severity of less than about 5, such as less than about 2.5, or less than about 1.5.

The artifacts may produce a diffraction effect when the artifacts have a period in the range of about 4,500 nm to about 850,000 nm. The artifacts may be arranged in rows, such that there is a periodic spacing of the artifacts within each row and a periodic spacing between adjacent rows. The rows may extend in the scan or process path direction of the ablation process, with the artifacts being formed by overlap of the laser spots in the scan direction. The artifacts in adjacent rows may or may not be aligned. The distance between the rows may be defined by the offset or pitch of the scan lines in the laser ablation process. In some embodiments, the period of the artifacts in the scan or process direction within the row may be about 45,000 nm, and the period between the rows in the line offset direction may be about 85,000 nm.

The height of the artifacts produced by the laser ablation process may also affect the diffraction severity. The height of the artifacts may be referred to as the "peak-to-valley" distance, and extends perpendicular or substantially perpendicular to the major plane in which the workpiece extends. The peak-to-valley distance that produces a diffraction severity of less than about 5 is impacted by the media adjacent to the surface containing the artifacts. In some embodiments where the adjacent media is air, a diffraction severity of less than about 5 may be produced by a peak-to-valley distance of less than about 15 nm, such as less than about 10 nm, or less than about 7.5 nm. In other embodiments where the adjacent medium has a refractive index greater than 1, a diffraction severity of less than about 5 may be produced by a peak-to-valley distance of less than about 25 nm, such as less than about 18 nm, or less than about 13 nm. An adjacent medium with a refractive index greater than one may be any appropriate material, such as an electrochromic material when the ablated workpiece is included in an electrochromic device.

FIG. 1 is a side cross-sectional view of an example of a laser ablation process as performed on a workpiece 10. The workpiece 10 is a coated substrate, including a substrate 12 and a coating layer 14. The illustrated process is a second surface ablation process in which the coating layer 14 is located at a second side 16 of the workpiece 10 opposite a first or impingement side 18 of the workpiece. A laser beam 100 is provided by a laser source 102 and propagates toward the workpiece. In this example, the laser beam 100 is configured with a focal plane at or near a second surface 20 of the substrate 12 and generally parallel with the x-y reference plane to define a laser spot 104 with a characteristic size such as a diameter or width w at the second surface. In other examples, the focal plane can be spaced from the second surface 20 by an amount greater than 0 mm up to about 50 mm. The substrate 12 is at least partially transparent to the particular wavelength of laser light of the laser beam 100 so that the beam passes through the thickness of the substrate to the second surface 20, where the material of the coating layer 14 absorbs at least some of the energy of the laser beam and is thereby separated from the substrate.

In the example of FIG. 1, the removed coating layer material 22 is illustrated in the form of solid particles. The workpiece 10 can be oriented as shown so that gravity causes the removed material 22 to fall away from the workpiece 10. Optionally, a vacuum source 106 is provided to help guide the removed material 22 away from the workpiece 10. The removed material 22 may be in vapor or liquid form when initially separated from the substrate 12. The illustrated arrangement is useful to prevent the removed material 22 from being redeposited on the workpiece 10, which can be problematic with some first surface ablation processes. The material may also be removed via a spallation process.

Figure 2:
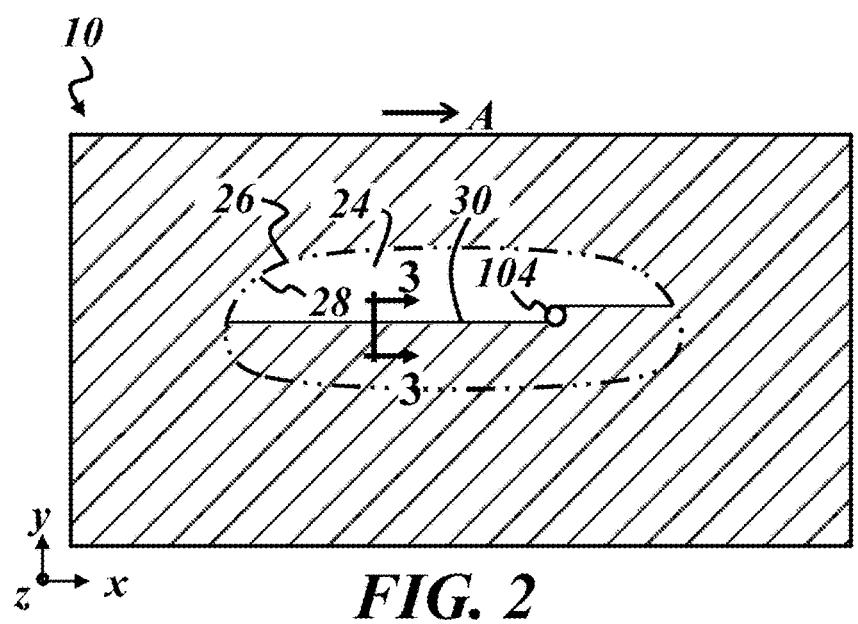
FIG. 2 is a top view of the process of FIG. 1.

In order to remove material from an area of the workpiece 10 that is larger than the laser spot 104, the laser beam 100 and/or the workpiece 10 may be moved relative to each other to remove material at a plurality of adjacent and/or overlapping laser spot locations. For instance, after the desired amount of material is removed at a first laser spot location, the workpiece 10 and/or laser beam 100 may move to define a second laser spot location for further removal of material. Continued movement to multiple adjacent or overlapping laser spot locations with corresponding material removal at each location defines an ablated area 24 of the workpiece 10 from which material has been removed, as shown in a top view of the process in FIG. 2, where an intended ablation area 26 is shown in phantom. In FIGS. 1 and 2, the laser beam 100 is moving in an instant process direction A with respect to the workpiece 10. One or both of the laser beam 100 or the workpiece 10 may be moved to achieve this relative movement. In one example, the laser beam 100 moves or scans back and forth in the positive and negative x-direction within the intended ablation area 26, and the laser beam and/or the workpiece 10 is indexed in the y-direction each time the laser beam reaches an edge 28 of the intended ablation area until the coating layer 14 is removed within the entire intended area.

A high-frequency pulsed laser may be used in conjunction with workpiece 10 and/or laser beam 100 movement at a particular rate in the process direction to determine the spacing between adjacent laser spot locations. In a non-limiting example, a laser beam operating with a pulse frequency of 400 kHz with a rate of movement with respect to the workpiece of 20 m/s in the process direction will result in laser spot locations every 50 µm in the process direction. Laser spot locations thus overlap when the cross-sectional dimension of the laser beam 100, measured in the process direction, is greater than the spacing between adjacent laser spot locations. A single pulse or a pulse burst may be delivered at each laser spot location, where the pulse durations are generally one or more orders of magnitude less than the time between pulses. Spacing among laser spot locations may be selected so that adjacent spot locations at least partially overlap to ensure material removal between adjacent locations, particularly with non-rectangular beam cross-sections. In some embodiments, the artifacts and/or the arrangement thereof are referred to or considered as a periodic structure or periodic structures.

The illustrated process is useful as an alternative to material addition processes to form a product with coated and uncoated portions. Material addition processes (e.g., painting, plating, vapor deposition, sputtering, etc.) typically require the use of some form of masking to help define a boundary between the coated and uncoated portions by preventing the coating material from being deposited at the desired uncoated portion. In such processes, a physical mask may be placed between a coating material source and the substrate to physically block the coating material at the desired uncoated portion(s) of the substrate, or a resist coating material may first be coated onto the desired uncoated portion (while masking the desired coated portion) and subsequently removed after the coating material is deposited over the substrate, including over the resist coating layer.

In the above-described laser ablation process, the workpiece 10 can be presented with the coating layer 14 at both of the desired coated and uncoated portions (e.g. an entire substrate surface), and the coating layer can be selectively removed to form the uncoated portion (i.e., the intended ablation area 26). The laser ablation process can reduce or eliminate the need for the additional tooling and process steps that are required in material addition processes where it is desired to coat only a portion of the substrate. The laser ablation process is also more flexible, as the size and/or shape of the intended ablation area 26 (i.e., the uncoated portion of the product) can be changed through a relatively simple reprogramming of the laser system without the need to clean or produce new physical components such as masks.

In addition, newly formed edges of the coating layer 14 may be better defined than corresponding edges of a coating deposited in a material addition process. This phenomenon is illustrated schematically in FIGS. 3A, 3B, 4A and 4B. FIG. 3A is a cross-sectional view of a processed edge 30 of the coating layer of FIG. 2, and FIG. 3B is a cross-sectional view of an edge 30' of a coating layer applied in a material addition process with masking. As shown in FIG. 3A, the processed edge 30 can be formed at an angle θ with the underlying surface 20 that is substantially perpendicular or near perpendicular. The coating layer produced by masking and coating deposition shown in FIG. 3B has an edge 30' that gradually tapers from the full thickness of the coating layer over a much greater characteristic length L' and forms a much lower average angle θ' with the substrate, due in part to shadowing effects from the mask. The laser ablation process can produce an angle θ between the edge 30 and the substrate surface 20 in a range from 30 degrees to 90 degrees, or from 30 degrees to 120 degrees. In some applications, an angle θ on the higher end of this range may be preferred, such as a range from 70 degrees to 90 degrees.

The characteristic length L of the taper from full thickness to zero thickness can be related to the laser spot size and/or the coating thickness in the laser ablation process. In some embodiments, the characteristic length L is less than or equal to one half of the diameter or width of the laser spot. Thus, for a 200 µm diameter laser spot, the characteristic length L may be 100 µm or less. In some cases, the characteristic length L is less than or equal to one quarter of the diameter or width of the laser spot—i.e., 50 µm or less with a 200 µm laser spot. The characteristic length L may be less than or equal to twice the nominal thickness of the coating layer 14, such that a 100 nm coating layer may have a processed edge 30 that tapers from 100 nm to zero over a length of 200 nm or less. In other examples, the characteristic length L may be up to 10 times the nominal thickness of the coating layer. In other embodiments, the characteristic length L is less than or equal to the nominal thickness of the coating layer 14, or only a fraction of the nominal thickness of the coating layer, such as from 0.01 to 0.99 times the nominal thickness of the coating layer. In embodiments where θ is near 90 degrees, for example, the characteristic length L may be in a range from about 0.01 to about 0.10 times the nominal thickness of the coating layer. In other embodiments, the characteristic length L may be in a range from about 0.01 to about 1.0 times the nominal thickness of the coating layer FIG. 4A is a schematic top view of FIG. 3A, illustrating the shape of the ablated edge 30 on a microscale. The edge 30 is characterized by a scalloped shape, resulting from partially overlapping laser spot locations with a round or circular laser beam cross-section having a diameter w (only the radius w/2 is shown in FIG. 4A). As shown, the edge 30 is not perfectly straight when viewed on a size scale close to that of the laser spot size. The shape of the illustrated edge 30 may be uniform, however, even if not perfectly straight or smooth. For instance, when the laser ablation process is configured so that the laser beam and workpiece move at a constant relative speed with laser pulses delivered to the workpiece at a constant frequency, the processed edge 30 has a periodic shape with equal peak-to-peak and valley-to-valley spacing D in the process direction, as shown. The peak-to-valley distance or depth d, measured in a direction transverse to the process direction, may increase with increased process motion or speed and decrease with increased laser pulse frequency, both of which are related to the amount of overlap associated with adjacent laser spot locations. In one example, where the distance D between laser spot locations is about one-third the diameter w of the laser beam (D=w/3), the depth d of the scallops may be about 2-5% the diameter w of the laser beam. A smaller distance D, such as one-quarter the diameter of the laser beam (D=w/4), leads to a smaller depth d, such as about 2% of the diameter of the laser beam. A larger distance D, such as one-half the diameter of the laser beam (D=w/2), leads to a larger depth d, such as about 6-8% of the diameter of the laser beam.

While the edge 30 may not be perfectly smooth or linear on the illustrated microscale, the periodic uniformity of the processed edge helps provide a smooth appearance when perceived by the naked eye. As shown in FIG. 4B, a mask-produced edge 30' is also not perfectly smooth on a microscale. But the non-uniformity along the edge leads to a macro visual appearance that may be perceived as an unsmooth edge, even if the average peak-to-valley depth d is the same as that produced with the laser ablation process.

Figure 5:
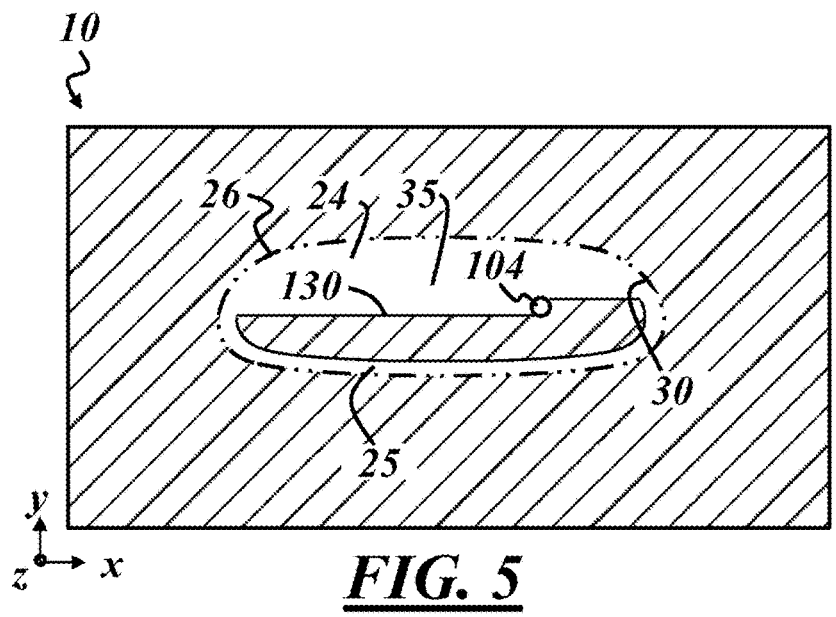
FIG. 5 is a top view of the process of FIG. 1 illustrating an alternative process path.

FIG. 5 illustrates an embodiment in which the laser ablation process is performed along a perimeter of the intended ablation area 26 before the remaining portion within the perimeter is ablated. The speed of the laser beam with respect to the workpiece 10 along the process path may be constant in the instantaneous direction of movement along the perimeter of the intended ablation area 26 to achieve a uniform edge at the perimeter. Performing the ablation process such that a portion of the overall process path follows the shape of the perimeter of the intended ablation area 26 facilitates use of a larger laser beam cross-section and shorter process times by enabling the use of less overlap in one of the index axes while also providing a processed edge at the perimeter of the ablation area that has a smooth appearance, particularly with non-rectangular ablation areas that have curvilinear edges such as in FIGS. 2 and 5. Alternatively, the perimeter of the ablation area can be the final portion of the area from which the coating layer is removed.

In the example of FIG. 5 the intended ablation area 26 includes a first region 25 along the edge or perimeter of the intended ablation area and a second region 35 that includes the remainder of the intended ablation area. One or more process parameters may be different in the first region 25 than in the second region 35. In this example, the first region 25 is located along the perimeter of the intended ablation area and results in ablated edge 30. The width of the first region 25 may be greater than or equal to the laser spot size used in that region. Examples of process parameter(s) that may be different in the first region than in the second region include laser spot size w, spot-to-spot distance D, laser pulse frequency, speed of laser spot movement along the process path relative to the workpiece, and pulse or pulse burst duration at each laser spot, to name a few. In some cases, the first region 25 is not necessarily at the outermost perimeter of the intended ablation area 26. The first region 25 may be an inner perimeter, for example, and/or may be located along visual features within the outer perimeter of the intended ablation area 26.

Process parameters may be selected such that the resulting ablated edge 30 at the first region 25 has different characteristics than an in-process ablated edge 130. With reference to FIG. 4A, for example, the peak-to-valley depth d along the resulting ablated edge 30 at the perimeter of the intended ablation area 26 may be less than the peak-to-valley depth d of the in-process ablated edge 130 within the second region 35. The in-process ablated edge 130 is defined as an ablated edge that only temporarily exists (i.e., it is subsequently removed during the ablation process or in a post-process). Where the ablated edge 30 is a visible feature of a finished product, forming the edge 30 with a smaller peak-to-valley depth d in one region compared to another region allows the visibility of a scallop-shaped edge to be reduced while maintaining higher process speed along portions of the workpiece where edge visibility is unimportant because the in-process edge only exists temporarily. In the first region 25, for example, the laser spot may be smaller, the spot-to-spot distance D may be smaller, the laser pulse frequency may be higher, and/or laser spot speed along the process path may be lower than in the second region 35. Preferably, the depth d is less than about 250 microns, more preferably less than about 100 microns, and most preferably less than about 50 microns. These and/or other process parameters may be varied between the first and second regions 25, 35 to additionally or alternatively result in the ablated edge 30 having a peak-to-peak or valley-to-valley distance D that is less than the distance D along the in-process edge 130.

The process is of course not limited to removing the entire coating layer in any particular area of the workpiece. The laser ablation process can be used to selectively remove coating material to form decorative patterns, functional patterns, and/or indicia, for example. Desired patterns or indicia can be formed from the portion of the coating layer remaining over the substrate after the ablation process, or they can be formed by the ablated area itself. Second surface ablation has the additional advantage that, due to the at least partially transparent substrate, decorative features or indicia can be viewed through the first side of the finished product. The ablated workpiece can be assembled with the remaining coating layer facing toward the inside of an assembly such that it is protected from damage and from the environment by the substrate.

Figure 6:
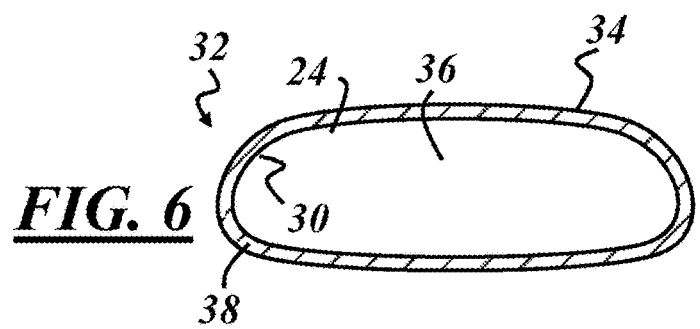
FIG. 6 is a component formed from ablated workpiece of FIG. 5.

FIG. 6 illustrates one example of a component 32 that can be formed from the ablated workpiece. Component 32 is taken from the interior of the workpiece 10 of FIG. 5 by cutting, scoring, or otherwise separating it from the surrounding portion of the ablated workpiece. In one embodiment, a series of laser induced damage channels can be formed in the substrate along a desired line of separation to facilitate removal of the component 32 from the ablated workpiece. Examples of laser induced damage channels and processes for forming them in a substrate are described in greater detail by Bareman et al. in U.S. Pat. No. 8,842,358. An edge 34 of the component 32 is formed along the line of separation. In this example, the edge 34 circumscribes the ablated area 24 formed during the ablation process and is generally parallel with the processed edge 30 of the remaining coating layer. The component 32 thus formed includes a window 36 with approximately the transparency of the substrate and a border 38 having the optical and other physical properties of the coating layer material.

The border 38, and in fact the coating layer of the original workpiece, may be formed from nearly any material (e.g., metallic, plastic and/or ceramic) and may generally be less transparent than the substrate. Certain metallic materials, such as chromium or chromium-containing materials, may be multi-functional, providing reflectivity, opacity, conductivity, along with a potentially decorative aspect. In some embodiments, the coating layer as provided to the ablation process is itself a multi-layer coating. For instance, the coating layer may include a reflective layer in direct contact with the substrate and a light-absorbing layer over the reflective layer to minimize reflection of the laser light in the ablation process. In other embodiments, some of which are described below in further detail, the workpiece may include an additional layer between the substrate and the coating layer. The additional layer may be any appropriate material. In some embodiments, the additional layer may be at least partially transparent, and may have a transparency substantially similar to the transparency of the substrate. The additional layer may conduct electricity, and in some embodiments may be formed of a transparent conductive oxide (TCO). In some embodiments, the additional layer may be a dielectric layer. In some embodiments, the additional layer may include multiple layers as part of a multi-layer stack structure. The multi-layer stack structure may include one or more layers of TCO materials, dielectric materials, insulator materials, metal materials, or semiconductor materials. The selection of materials for inclusion in the additional layer may be influenced by the refractive index, thickness or sequencing of the layers to achieve a desired reflectance, transmittance, and/or color in the ablated area, non-ablated area, or both. In the description below the additional layer may be referred to as a conductive layer, but it is understood that other additional layer materials described herein may be employed in place of the conductive layer. The coating layer can be selectively ablated from the TCO or dielectric layers. The coating layer may include one or more reflective layers comprising one or more metallic material, metal oxide, metal nitride or other suitable material that provides both reflectivity and opacity. In one embodiment, the workpiece includes a glass substrate, a layer of indium tin oxide (ITO) on the glass substrate, with a coating layer that includes sequential and adjacent layers of chromium (Cr), ruthenium (Ru), Cr, and Ru to form a glass/ITO/Cr/Ru/Cr/Ru material stack.

In one embodiment, the component 32 or similar component having a coating layer from which material has been laser ablated, is a mirror component, such as a component of a vehicle rearview mirror assembly. The border 38 of the component 32 may serve to eliminate the need for a separate frame for such a mirror and may also serve other functions, such as providing electrical conductivity, electrical insulation, reflectivity, and/or concealing electrical connections or other mirror assembly components. In one particular example, the component 32 is the front piece of an electrochromic mirror assembly in which an electrochromic medium is encapsulated in a cavity formed between the back side of the component 32 (i.e., the second side 16 of the original workpiece 10 of FIG. 1) and a second similarly shaped component. Some examples of electrochromic mirror assemblies are also given in the above-referenced U.S. Pat. No. 8,842,358 and in some of the documents referenced therein. Other non-mirror electrochromic devices (e.g., electrochromic windows or lenses) may also be formed from the ablated workpiece, as can non-electrochromic assemblies.

Some devices that may employ at least a portion of the laser ablated workpiece, such as electrochromic devices, may require one or more electrically conductive layers such as an electrode layer. In an electrochromic device, for example, electrodes may be included on opposite sides of the electrochromic medium wherever it is desired to activate the electrochromic medium in the device. The component 32 may thus also include an electrically conductive layer along at least a portion of the window 36, corresponding to the ablated portion 24 of the original workpiece. The electrically conductive layer may be formed from a TCO or other suitable conductive material, such as ITO. In one embodiment, the conductive layer overlies the entire window 36.

Figure 7A:
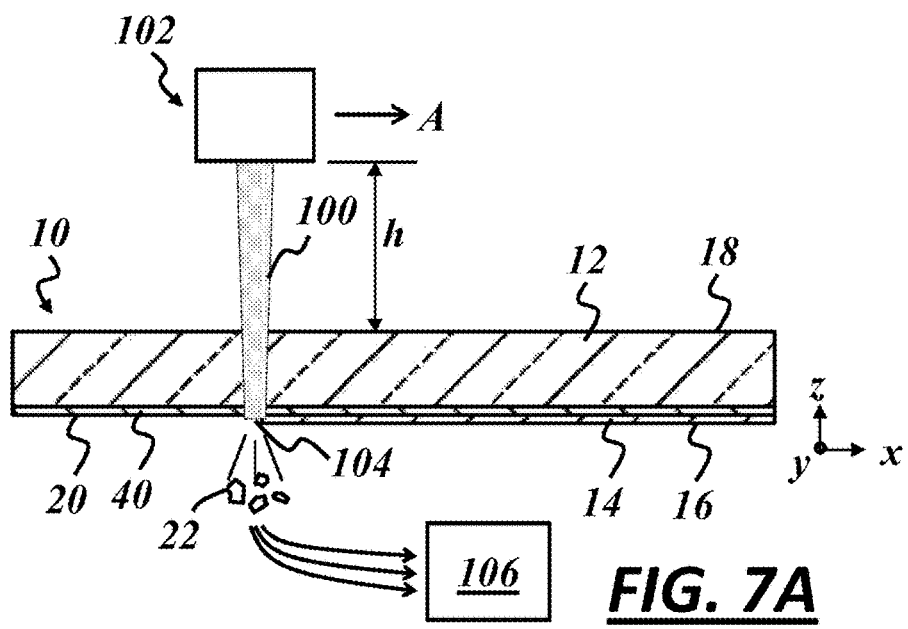
FIG. 7A is a side cross-sectional view of an embodiment of the second surface laser ablation process, where the workpiece includes an additional material layer.

As shown in FIG. 7A, the above-described second surface laser ablation process is compatible with TCO materials or other at least partially transparent conductive layers. The materials are at least partially transparent to the wavelength of the laser employed in the laser ablation process. The workpiece 10 in the illustrated process includes an electrically conductive layer 40 at the second side 16 of the workpiece between the substrate 12 and the coating layer 14. The conductive layer 40 provides the second surface 20 from which the coating layer 14 is removed, in this example. The illustrated process represents an example of a laser ablation process in which the laser beam 100 propagates through the conductive layer 40, such as a metallic layer or TCO layer, to remove material from an opposite side of the conductive layer. In other embodiments, the electrically conductive layer may be disposed over the second side of the workpiece after the ablation process. This alternative allows for application of the conductive layer only on selected workpieces. The laser wavelength may be selected to minimize absorption by the conductive layer. In one non-limiting example, a laser having a wavelength of 532 nm is used with an ITO conductive layer in order to minimize absorption or damage to the conductive layer 40. In other embodiments, other wavelengths such as an IR laser at 1060 nm could be used.

Figure 7B:
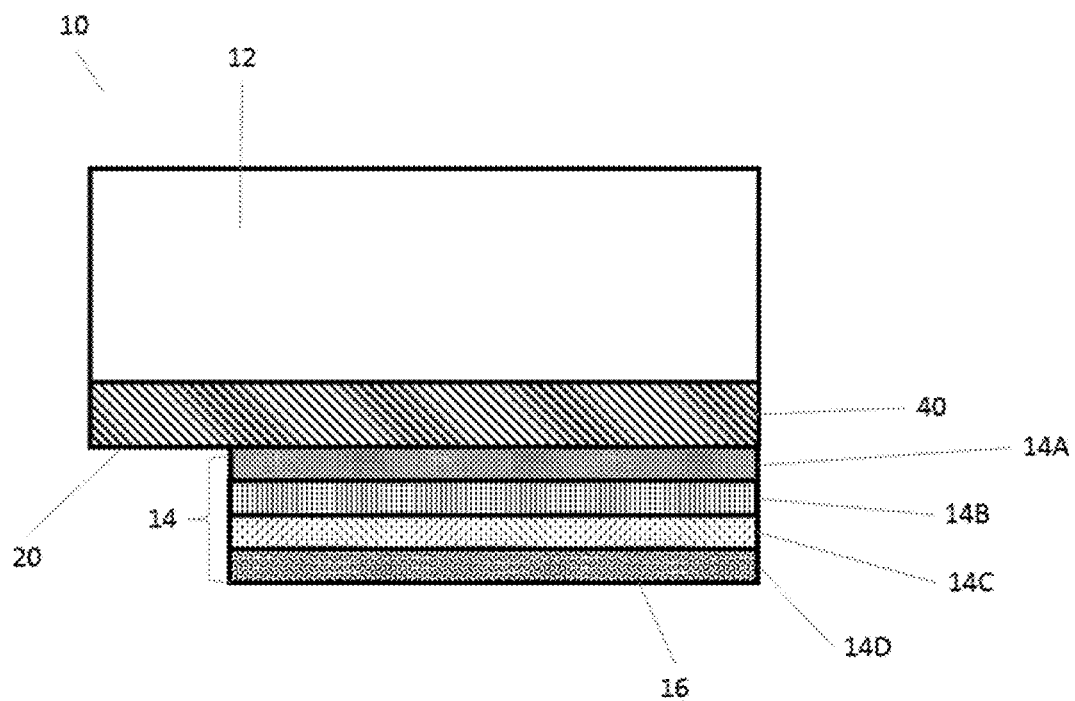
FIG. 7B is a side cross-section view of an embodiment of a workpiece that has been subjected to the second surface laser ablation process, where the additional material layer includes a plurality of sub-layers.

As shown in FIG. 7B, the coating layer 14 may be a single layer or multi-layer. The function of each layer in the multi-layer may be selected to perform different physical, chemical or optical functions. For example, referring to FIG. 7B, coating layer 14 may be subdivided into multiple sub-layers. In some embodiments, a sub-layer 14A adjacent the conductive layer 40 may be an adhesion promoting layer, such as a layer including Cr or Ti. A second sub-layer 14B may be a reflecting layer. The reflecting layer may include a silver-gold alloy chrome, ruthenium, stainless steel, silicon, titanium, nickel, molybdenum, chromium-molybdenum-nickel alloys, nickel chromium, nickel-based alloys, Inconel, indium, palladium, osmium, cobalt, cadmium, niobium, brass, bronze, tungsten, rhenium, iridium, aluminum, aluminum alloys, scandium, yttrium, zirconium, vanadium, manganese, iron, zinc, tin, lead, bismuth, antimony, rhodium, tantalum, copper, gold, platinum, any other platinum group metals, alloys whose constituents are primarily the aforementioned materials, and combinations thereof. A third sub-layer 14C may be an opacifying layer. The opacifying layer may include nickel silicide, chrome, nickel, titanium, Monel, cobalt, platinum, indium, vanadium, stainless steel, aluminum titanium alloys, niobium, ruthenium, molybdenum tantalum alloys, aluminum silicon alloys, nickel chrome molybdenum alloys, molybdenum rhenium alloys, molybdenum, tungsten, tantalum, rhenium, alloys whose constituents are primarily the aforementioned materials, and combinations thereof. The opacifying layer may include materials with real and imaginary refractive indices being relatively large, such as oxides, nitrides, or the like. A fourth sub-layer 14D may be an electrical stabilization layer. The electrical stabilization layer 14C may be include the platinum group metals, such as Iridium, Osmium, Palladium, Platinum, Rhodium, Ruthenium, and their alloys or mixtures. Additionally, layer 14 may be further sub-divided such that any sub-layer may comprise further sub-layers within themselves to meet the requirements of the stack.

The relationship between laser wavelength and energy absorption by the materials in the workpiece highlights at least one surprising result of performing laser ablation through transparent materials. It has been found that, although certain substrates and/or coatings, such as glass and ITO, are visibly transparent, they may absorb at least a portion of the energy in each laser pulse when passing therethrough. Material selection and process parameters must be selected and/or adjusted accordingly. For instance, different glass formulations may have different absorption spectra. One glass formulation may include trace elements with an absorption peak at or near the laser wavelength and thus may absorb some percentage of light passing therethrough, while another glass formulation may transmit essentially all of the incident light. The same holds true for coating layer materials. Absorption of laser energy by the substrate 12 and/or the optional coating layer 40 may be characterized by a threshold level above which the outer coating layer 14 cannot be removed without damage to the substrate and/or optional coating layer. Above this threshold, such a large portion of the laser energy is absorbed while passing through the workpiece that increasing the laser pulse energy to a level sufficient to remove the coating layer 14 while accounting for substrate and/or coating layer 40 absorption also surpasses the damage threshold for the substrate and/or coating layer 40.

It has also been found that the laser beam can be used to selectively alter one or more properties of a material layer through which it passes when the material layer has a non-zero absorption at the wavelength of the laser beam. For instance, during a second surface laser ablation process performed through a conductive layer 40, such as a layer of ITO or other TCO, one or more of the following characteristics of the layer 40 may be altered: surface roughness, electrical resistance, work function, carrier mobility and/or concentration. Further, certain characteristics may be altered by different amounts within the layer thickness, and layer thickness can be used to alter or control laser energy distribution within the overall stack of material layers. Some of these changes may be manifested in changes to final product behavior, such as when the conductive layer 40 is an electrode layer in an electrochromic device formed from the ablated workpiece.

In one example, the surface roughness of the additional layer 40 is increased at the ablated area of the workpiece relative to the surface roughness of the additional layer 40 as measured before the coating layer 14 to be ablated is applied. Increased surface roughness may have positive or negative effects, depending on the end application. For instance, increased roughness may correspond to increased surface area in some applications (i.e., more surface contact with an electrochromic (EC) medium in EC devices) or better surface wetting or adhesion in other applications. If surface roughness is sufficiently high, reduced clarity (i.e., more scattering of light) could result on a transparent substrate, which could be advantageous or detrimental, depending on the application. Performing laser ablation through a coating layer that is not removed thus represents an unconventional approach to altering surface characteristics of the unremoved coating layer.

Where the additional layer 40 is electrically conductive, the laser beam may alter the electrical resistance of the layer. Though the mechanism is not fully understood, electrical resistance can be affected in both direction. In some cases, where a sufficiently large amount of laser energy is absorbed by the conductive layer 40, the electrical resistance can increase, possibly due to some damage or breakdown within the layer. In other cases, a smaller amount of energy absorption within the conductive layer can result in lower electrical resistance.

In certain embodiments, another property of the conductive layer 40 affected by the laser beam passing therethrough is the work function of the conductive layer. This changed characteristic has been shown to manifest itself in a functioning electrochromic device made from the ablated workpiece, where the ablated area of the workpiece darkens at a higher or lower rate than unablated areas of the same workpiece Certain semi-conducting properties of the conductive layer may also be altered by the laser beam during the ablation process, such as carrier concentration and/or carrier mobility. For instance, these material characteristics may be selectively altered at the ablated surface either by removal of a portion of the conductive layer, or by preferentially modifying the surface properties by exposure to the laser beam One manner of controllably affecting these and other changes in the additional material layer 40 is via the thickness of the layer. For example, increased thickness of an additional material layer that absorbs a portion of the laser light passing therethrough increases the total amount of energy absorbed in the layer 40 and may increase the effect the laser has on the layer 40. The thickness of layer 40 may also affect the uniformity of the property change or changes. For instance, the property changes may be greater at one portion of the thickness of the layer 40 than at another portion of the thickness, and increase thickness may increase the property gradient. In another example, the thickness of the additional layer 40 can be used to affect the distribution of laser energy in other layers of the workpiece. For instance, a self-focusing effect may occur within the layer 40, and the thickness of the layer may affect where the electric field is concentrated within the multiple layers of materials.

While the above-described laser ablation process can provide a processed workpiece with coated and uncoated portions without the need for the masking that is typical of material addition coating processes, masking can be advantageously employed in the laser ablation process. Masked laser ablation can form features that are sharper than those formed in masked coating processes and, in some cases, sharper than those formed by laser ablation alone. For instance, when a desired characteristic feature size is smaller than the cross-sectional size of the laser beam, masked ablation can be used to obtain such features without the negative effects associated with masked coating processes.

Figure 8:
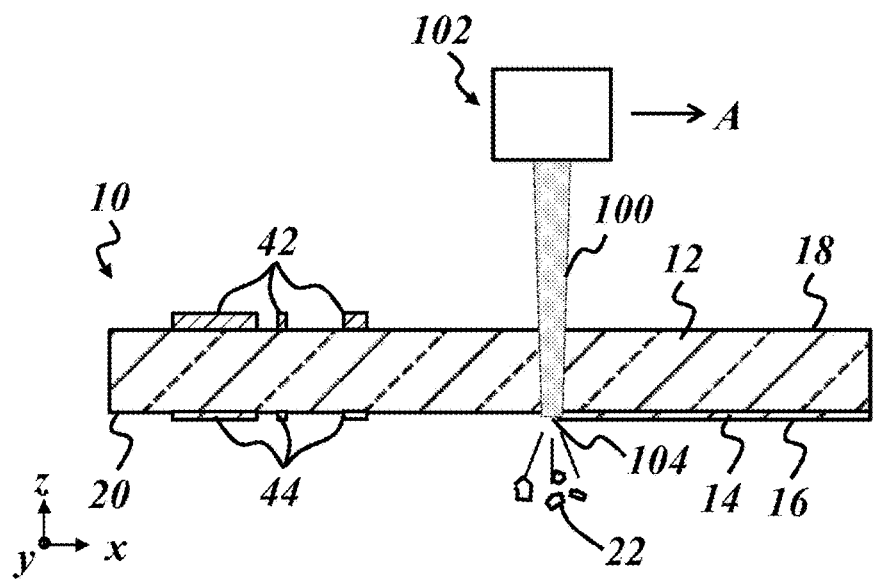
FIG. 8 is a side cross-sectional view of an embodiment of a masked laser ablation process.

One example of a masked laser ablation process is illustrated in FIG. 8. In this example, a mask 42 is provided at the first side 18 of the workpiece. The mask 42 includes open or otherwise light-transmitting portions and solid or otherwise light-filtering portions. When the laser beam 100 encounters the solid portions of the mask 42 while moving relative to the workpiece 10 in the process direction A, the beam is selectively blocked by the solid portions of the mask. Features 44, such as indicia, are thereby formed directly opposite the solid portions of the mask 42 in the form of unablated portions of the coating layer. The solid portions of the mask 42 need not be completely opaque or light-blocking. It is only necessary to attenuate the laser beam by an amount sufficient to prevent ablation at the second surface 20. In fact, the masked ablation process facilitates optimization of certain aspects of the ablation process such that preventing only a small portion of the light from being transmitted through the substrate may be necessary to form features 44.

For instance, one manner of optimizing the laser ablation process is to maximize the removal rate of the coating layer 14 by maximizing the cross-sectional size of the laser beam 100 and the associated laser spot 104 (e.g., via selection of laser optics), along with the speed at which the laser is rastered along the workpiece 10. This optimization is limited by the flux at the second surface 20 being reduced as the square of the beam radius at the surface. Above a threshold spot size, the energy flux falls below the ablation threshold for the coating layer, resulting in a net loss of performance. It is thus useful to configure the laser spot size and raster speed to just above the ablation threshold to reduce the process cycle time. A large spot size improves overall coating removal rate, but it may limit the size scale on which indicia can be formed, in the absence of masking. For example, if a 200 micron diameter laser spot size is used to rapidly remove the coating layer, smooth and/or fine features on a 50 or 100 micron scale cannot be formed, whether part of indicia or other features, due both to the overall size of the spot and its round shape. Employing a non-circular beam (e.g., rectangular) can help eliminate the above-described scalloped shape of the processed edge and reduced the amount of overlap required by adjacent laser spot locations. But formation of features smaller than the laser spot is problematic, even with shaped beams. Some processes employ a second, smaller beam to form the small features while using a larger optimized beam to remove the bulk of the coating layer material.

The masked laser ablation process eliminates the need for a second laser beam and the associated second process path, resulting in a much faster process that can use a single optimized beam. In some cases, masked ablation can be used as an alternative to different process parameters being used in first and second regions of the intended ablation area, as described above, in order to achieve an ablation process with one set of process parameters that does not change over the entire intended ablation area. As used in the laser ablation process, the mask 42 provides other process advantages. For instance, there is no coating material deposited on the mask 42 in the laser ablation process as is sometimes the case in masked coating processes. Also, the mask may be formed from materials that are not compatible with masked coating processes. For example, some coating processes are performed at high temperatures and/or with chemically active or reactive materials. The masks used in such processes must withstand these harsh conditions, while the mask 42 used in the laser ablation process is not exposed to high temperatures or a reactive environment. The mask 42 only encounters the laser beam 100. Moreover, the mask 42 may be located away from the focal plane of the laser beam 100 and may thus be less affected or relatively unaffected by the energy of the beam.

Another advantage of the masked ablation process is improved consistency and/or performance of other coating layers, such as the above-described conductive coating layer. For instance, even if masked ablation does not decrease process time and even if it does not improve the overall appearance of the ablated edge compared to the unmasked process, performance of the finished product may be improved. In an example where the laser ablation process is performed before the conductive coating is applied, the essentially smooth ablated edge resulting from the masked laser ablation facilitates a correspondingly smooth transition in the conductive coating layer at the boundary between the ablated area and the unablated area. Whereas a scalloped ablated edge may result in stress concentrators and/or imperfect spots in the overlying conductive coating layer at the peaks of the scallops, for instance, the conductive coating may be more consistent and smooth with less imperfections and/or stress concentrators when applied over the ablated edge resulting from the masked process. This and other advantages of the masked process may be realized even with first surface ablation processes and/or with opaque substrates.

In one embodiment, the mask 42 is formed in place on the first side 18 of the workpiece 10. Photolithography is one process that can form the mask 42 in the desired pattern. But photolithography can be expensive, time-consuming, and may require a mask of its own. Another method of forming the mask 42 in place on the first side 18 of the workpiece is by printing. A printing technique such as inkjet printing can be used to form the mask 42 by selectively depositing the mask material along the workpiece 10. With the mask 42 formed in place by printing, the size scale of the features 44 that can be formed by laser ablation is limited by the resolution of the printing technique rather than by the laser spot size.

In some cases, the above-described laser ablation process results in an ablated area with a measurable transmission haze. Transmission haze may result from diffusion or scattering of some of the light passing through the ablated substrate. While the exact cause of the haze is not fully understood, it may be attributed to residual coating layer material and/or inter-compounds of the coating material and the underlying material. The haze may also be partly attributed to some roughening, damage, or other material change at the removal surface, whether caused directly by the energy of the laser beam, or indirectly by forces or other phenomena resulting from the separation of the coating layer from the underlying material. It is possible to form the ablated area of the workpiece with a transmission haze of 0.05% or less, on average. In some cases, the haze may be higher, and the maximum allowable haze may depend on the intended use of the workpiece.

One manner of reducing the haze associated with the laser ablation process is through the use of a laser system that delivers pulses of the laser beam on a picosecond or shorter time scale. Picosecond lasers are configured to deliver the energy necessary for coating material removal in laser pulses with durations in a range from about 0.5 to about 500 picosends (ps). Pulse durations of several tens of picoseconds may be preferred, such as 1-50 ps or 50 ps or less. Commercially available picosecond lasers can provide pulse durations of less than 20 ps, less than 10 ps, less than 5 ps, or less than 1 ps, to name a few. Femtosecond lasers having a pulse duration in a range from about 0.5 to about 500 femtoseconds (fs) can provide some of the same advantages as picosecond lasers when compared with nanosecond lasers (0.5 to 500 ns pulse duration).

Figure 9A:
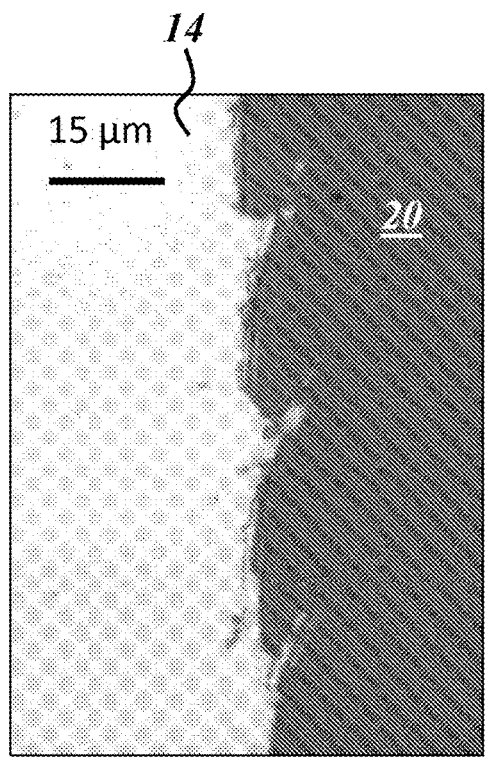
FIG. 9A is a photomicrograph of a laser ablated edge formed by a picosecond laser.
Figure 9B:
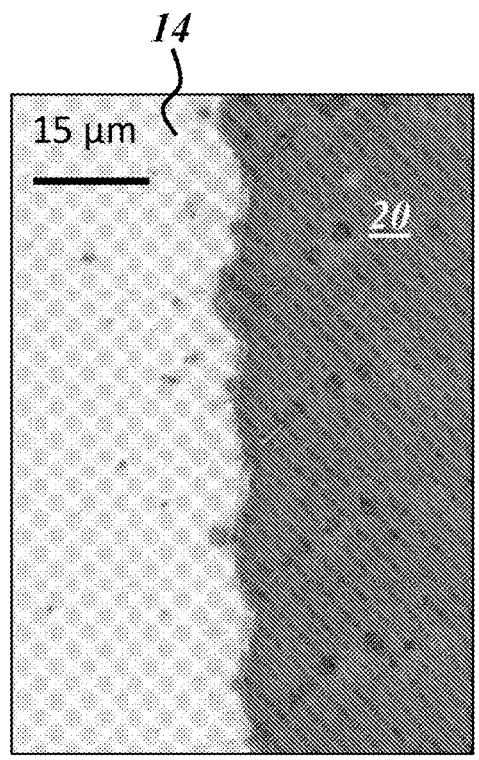
FIG. 9B is a photomicrograph of a laser ablated edge formed by a nanosecond laser.

FIGS. 9A and 9B are photomicrographs of processed edges of metallic coating layers 14 formed by laser ablation. A picosecond laser was used to remove the coating layer 14 from the substrate 12 in FIG. 9A, and a nanosecond laser was used to remove the coating layer from the substrate in FIG. 9B. The amount of haze at the ablated area of the picosecond laser ablated workpiece is visibly less than that of the nanosecond laser ablated workpiece. Generally, the heat-affected zone is smaller with the picosecond laser. In addition to the lower amount of haze associated with the picosecond laser, the uniform (i.e., periodic) shape of the processed edge is more apparent than with the nanosecond laser, possibly due to less molten coating material being formed during processing with the picosecond layer. The nanosecond laser processed edge of FIG. 9B also has apparent microcracks extending away from the edge and into the remaining coating layer. The microcracks are about 10-15 microns long, on average, and are spaced along the processed edge about every 5-15 microns.

With further reference to FIG. 7A, experiments have been conducted to quantify changes to the conductive layer 40 when the laser beam passes through the conductive layer during an ablation process that removes coating layer 14 material from the workpiece 10. In these experiments, described further below, the conductive layer 40 is ITO deposited on a sodalime float glass substrate 12 having a thickness of 1.6 mm. ITO thickness was varied from workpiece to workpiece as a controlled variable. The coating layer 14 is chromium deposited on the ITO and having a thickness, such as approximately 50 nm, sufficient to arrive at visible light transmittance of approximately 0.4%. The laser ablation was performed using a picosecond laser.

As noted above, results of the ablation process depend on several parameters, including laser spot size, pulse energy, pulse width (i.e., pulse duration), and laser wavelength. Each layer, and in particular the coating layer 14, has an absorbed energy threshold at and above which physical removal of the layer will occur due to breaking of bonds (i.e., intermolecular, intramolecular, adhesive, etc.). The absorbance of each material in the workpiece 10, and thus the amount of energy absorbed at each location within the thickness of the workpiece, is a function of the wavelength of the laser light.

Absorbance also depends on the local intensity of the laser light. While this dependence can often be ignored, the relatively high peak pulse power delivered by ultra-short pulse lasers, such as picosecond, femtosecond, and certain nanosecond lasers, make this intensity-dependence relevant and sometimes dominant. Therefore, pulse width (i.e., pulse duration) is a relevant process parameter, especially in processes employing ultra-short pulse lasers. Pulse width also influences the dynamics of the energy absorption by the coating layer during the ablation process. For instance, relatively longer pulses may lead to heat dissipation in the coating layer material adjacent to and outside of the laser spot and can have the effect of reducing the temperature reached within the laser spot and/or can have the effect of damaging or otherwise affecting coating layer material outside of the laser spot. Material outside of the laser spot that is affected due to heat absorbed during the ablation process defines a heat-affected zone (HAZ) of the coating layer. Generally, a smaller laser pulse width leads to a smaller HAZ. Ablated material takes absorbed heat with it and potentially helps reduce the size of the HAZ in the unremoved coating layer material.

The main aspect of the laser process that controls the amount of surface patterning of the base layer, which in turn is the source of the diffraction effect, is the maximum intensity of the laser light during the process. The following description relates to the various terms impacting this aspect of the laser process. The pulse energy E can be calculated from the average power P of the laser and the repetition rate R via equation (1). The peak power $P_{Peak}$ is a function of the pulse energy E and the pulse width $\Delta t$. The peak power highest $P_{Peak}$ is a common name for either the average power during the pulse or the instantaneous s power during the pulse, depending on the situation. If the pulse width is known, but not the exact shape, then the peak power may be approximated by the pulse energy divided by the pulse width as shown in equation (2). If the exact shape of the pulse is known, the highest instantaneous power may be calculated accordingly $$P = E * R \qquad (1)$$

$$P_{Peak} \sim \frac{E}{\Delta t} \qquad (2)$$

The spot size w (FIG. 1) is defined and determined at the surface 20 from which the coating material 14 is to be removed and can be used to calculate the power per unit area, or the power density, at the laser spot. Alternatively, since the pulse energy is sometimes used directly instead of the average or peak power, the spot size can also be used to calculate the energy incident on the process surface per unit area per pulse, or the energy density, at the laser spot. If the transverse profile of the laser beam is not known, then the power density or energy density may be approximated as the peak power (or pulse energy) divided by the spot area. If the transverse profile is known, the power density (or energy density) may be calculated across the spot area accordingly.

A Gaussian beam is a common type of laser beam in which the transverse profile of the laser beam can be described by a Gaussian function. The Gaussian shape is the commonly known 'bell curve' shape, with a peak in the center and with tails that decay with a certain shape on either side of the peak. The Gaussian function approaches but never reaches zero away from the peak, but the laser beam will have some practical diameter outside of which the energy is negligible. Some common methods of determining the effective diameter of a Gaussian beam are the full-width at half maximum, the 1/e^2 width, and the D4σ width.

The diameter of a laser beam changes as it propagates through a focusing lens or other suitable optical element, and a focused beam changes in diameter through air beyond the lens. The beam will have a minimum width (or waist) at some location in space as determined by a set of one or more focusing lenses. The location and width of the waist can be calculated by using a few equations. The beam waist diameter (minimum radius, $w_0$) at any distance beyond a focusing optic in the direction of propagation may be calculated from the input beam diameter D1, the focal length f of the lens, and the wavelength $\lambda$, of the laser light using equation (3).

$$2w_0 = \frac{4\lambda}{\pi} \frac{f}{D1} \qquad (3)$$

As is apparent, the waist diameter $w_0$ of the beam decreases as the diameter D1 of the input beam increases. The behavior of the beam diameter near the waist can be calculated from equation (4), where z is the distance along the direction of light propagation and $z_R$ is the Rayleigh length. The Rayleigh length is defined as the distance (on either side of the beam waist) over which the beam remains less than $\sqrt{2}$ times larger than $w_0$. The Rayleigh length can be calculated as shown in equation (5).

$$w(z) = w_0 \sqrt{1 + \left(\frac{z}{z_R}\right)^2} \qquad (4)$$

$$z_R = \frac{\pi w_0^2}{\lambda} \qquad (5)$$

The Rayleigh length is sometimes referred to as half the 'depth of focus' and is commonly thought of as the distance over which the beam width does not change significantly. Depending largely on the waist diameter $w_0$, the Rayleigh length can vary significantly—e.g., from microns to miles. Ultimately, since the waist diameter is determined by the focal length of the lens and the input beam diameter, the Rayleigh length is also a function of those parameters.

Figure 10:
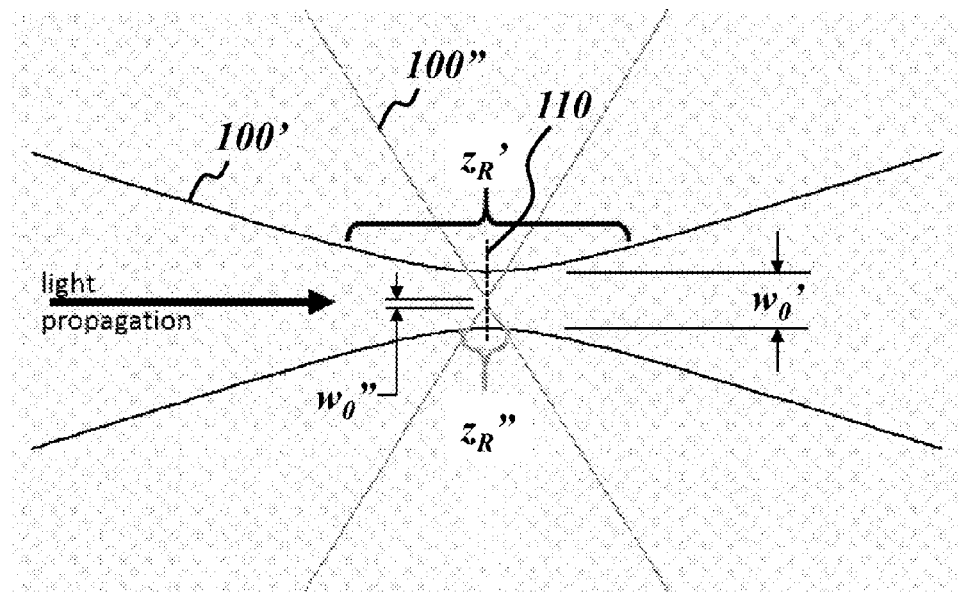
FIG. 10 illustrates two different laser beams with different beam waist diameters and Rayleigh lengths.

FIG. 10 illustrates two different laser beams 100', 100" superimposed over each other, where the focus optic is considered to be at the left side of the figure and the laser light propagates from left to right with respect to the figure. One of the laser beams 100' has a larger beam waist $w_0'$ than the beam waist $w_0''$ of the other laser beam 100". FIG. 10 also illustrates the focal plane 110 defined at the beam waist and the respective Rayleigh length $z_R'$, $z_R''$ of the respective beams 100', 100". Since the beam 100" has a smaller waist $w_0''$ with all else equal, the corresponding Rayleigh length $z_R'''$ is considerably smaller. In this example, the smaller waist $w_0''$ may be achieved using the same focusing lens but increasing the diameter D1 of the input beam.

In the specific case of a metal-off-ITO ablation process, such as in FIG. 7A with the coating layer 14 being metal and the conductive layer 40 being ITO, the equations above can be used to calculate certain parameters. In one example, a laser having 35 W average power, a 532 nm wavelength, a repetition rate of 400 kHz, and a 15 ps pulse width produces a pulse energy of 87.5 μJ and a peak power of approximately 5.8 MW, where peak power is calculated using the average over the pulse width. For a laser spot size of about 200 μm with the energy distributed evenly across the laser spot, the average power density is about 0.11 MW/cm². This power density or intensity is averaged over all time; if the power density is calculated during the pulse, the peak power density is $1.85 \times 10^4$ MW/cm².

In the example of FIG. 10, the waist $w_0'$ of the beam 100' is a factor of 5 larger than the waist $w_0''$ of the beam 100". In a specific illustrative example where $w_0'$=200 μm and $w_0''$=40 μm, the respective Rayleigh lengths are $z_R'$=59 mm and $z_R''$=2.3 mm with a laser wavelength of 532 nm. This example demonstrates how a change in the waist diameter, which can be effected by changing the focal length or the input beam diameter, for example, can result in a large change in the Rayleigh length or depth of focus. The larger the waist diameter, the larger the Rayleigh length.

When operating out of focus with a process spot size w larger than the waist diameter $w_0$, the range over which the beam diameter is close to the desired process spot size thus increases with an increasing waist diameter, as is apparent in FIG. 10 which illustrate different rates of increase of the respective beam diameters away from the waist.

In the examples described below, the spot size is changed by altering the height h (see FIG. 7A) of the workpiece relative to the focal plane 110—i.e., the narrowest part of the beam 100 at the waist as noted above. The stage height or simply height h is referenced as a convenient way to vary the relative location of the workpiece, and thus the intended ablation surface 20, to the focusing lens or final optical element. In these examples, a 550 f-theta lens was used resulting in a focal distance, measured from the lens to the focal plane, of about 540 mm. The initial working distance, or the distance between the lens and the workpiece, was h=631 mm, such that the focal plane is located along the direction of propagation between the final optic and the workpiece. The controlled variables were ITO (layer 40) thickness, the height h, the scan or sweep speed of the laser beam in the direction A of the process path, and the pitch p. Pitch is the distance between scan lines measured transverse to the process path.

As the height h is decreased so that the beam waist or focal plane gets closer to the workpiece and the surface 20 to be ablated, the laser spot size w is decreased and the energy density at the laser spot is increased. Conversely, as the height h is increased so that the beam waist or focal plane gets farther from the workpiece and the surface 20 to be ablated, the laser spot size w is increased and the energy density at the laser spot is decreased. As long as the energy density is at or above the ablation threshold, the coating layer 14 will be removed, whether from the conductive layer 40 of FIG. 7A, from the substrate 12, or from some other interlayer such as a dielectric layer.

Therefore, if excess energy in the beam is present—i.e., if the energy density at the laser spot is higher than the ablation threshold at a particular height h—the resulting laser ablation spot size will increase with increasing height h until some portion of the laser spot, usually near the perimeter, falls below the ablation threshold. As height increases beyond this value, the laser ablation spot size decreases. The potential for damaging or otherwise altering some characteristic of the substrate and/or any interlayer (e.g., TCO or dielectric layer) increases with decreasing height h, such as when the energy density of the laser spot is near its maximum value (i.e. at the beam waist). It should be noted that the height h is somewhat arbitrary and is used herein as a convenient way to measure, change, monitor, or control the distance between the focal plane of the beam and the plane of the laser spot.

Figure 11:
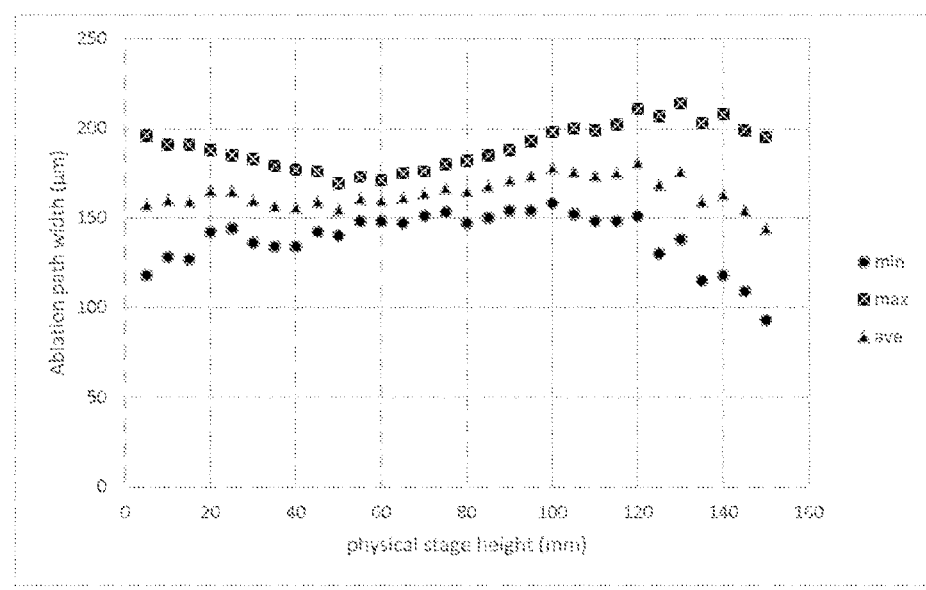
FIG. 11 is a plot of ablation path width as a function of stage height.

FIG. 11 is a plot of effective ablation path width as a function of height, as determined by measuring the width of the area from which the coating layer was removed along the process path, the width measurement being taken transverse to the process path direction using a microscope. The processed edges of the coating layer may not be perfectly parallel in practice, so the maximum and minimum widths along the ablation path were measured. The maximum, minimum, and average path width are plotted in FIG. 11. The narrowest path corresponds to near focus (50 mm stage height) while the wider ablation widths correspond to distances (in mm) away from focus in both directions. The maximum width at focus is about 170 µm, while the maximum width reached about 210 microns at about 130 mm stage height (80 mm above focus). Above the 130 mm stage height the ablation path width decreases as the energy density of the laser spot decreases and falls below the ablation threshold around the perimeter of the laser spot. Note that physical stage height, height h, and distance between focal plane and laser spot may all be different values, but a change in one of these variables is equivalent to the same amount of change in the others.

Figure 12:
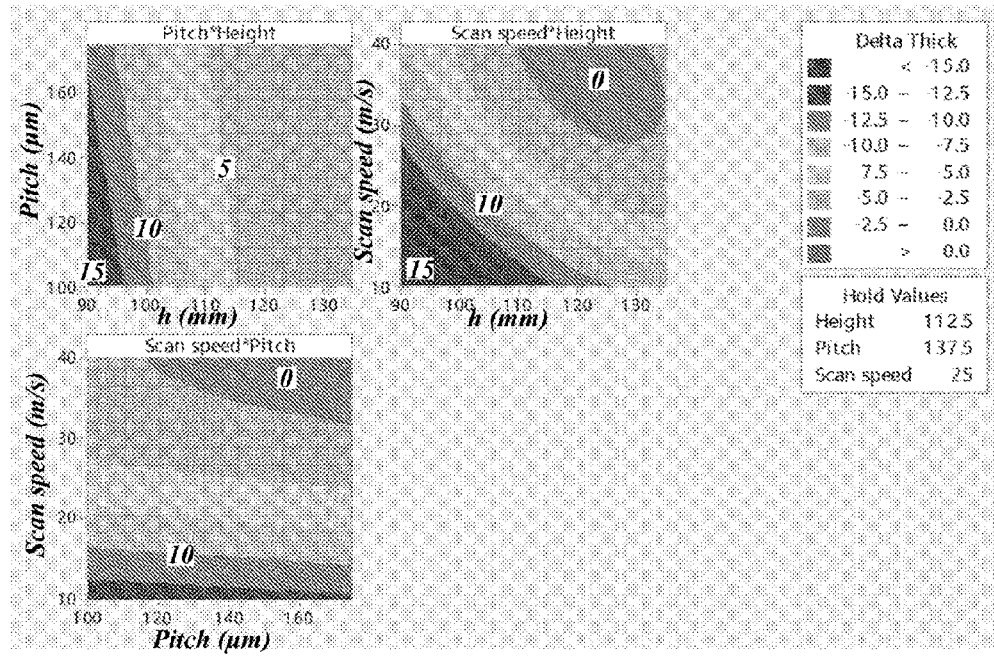
FIG. 12 includes contour plots of the change in thickness of a conductive layer as a function of pitch, scan speed, and stage height.

An unexpected impact on the properties of the material from which the coating layer is removed as a function of laser spot energy density has been discovered. For example, the thickness of the interlayer 40 (e.g., ITO) can be altered with negligible changes to other common quality metrics. FIG. 12 illustrates the change in ITO thickness as a function of scan speed, stage height and pitch. Each sub-graph is a contour plot showing change in ITO thickness in nanometers as a function of a two different process variables. These plots indicate that the ITO thickness can change appreciably with changes to laser ablation process variables. The maximum change in the ITO thickness occurs at low heights, slow scan speeds and small pitch values. ITO thickness generally decreases from its original coating thickness with decreased h (closer to focus), decreased scan speed, and decreased pitch. These conditions maximize the energy density and result in maximum overlap of adjacent laser spots. The plots also illustrate the full ITO thickness is maintained at some settings. The thickness change is thus controllable within a range from 0 to 15 nm. In various embodiments, the thickness change is less than about 15 nm, less than about 10 nm, less than about 5 nm, less than about 2.5 nm. In some applications, such as where the ITO or other conductive layer is used as an electrode, lower changes in thickness may be preferred to minimize layer electrical resistance. In other applications, increased electrical resistance may be desired or a particular uniform or non-uniform layer thickness may be desired for other reasons.

Figure 13:
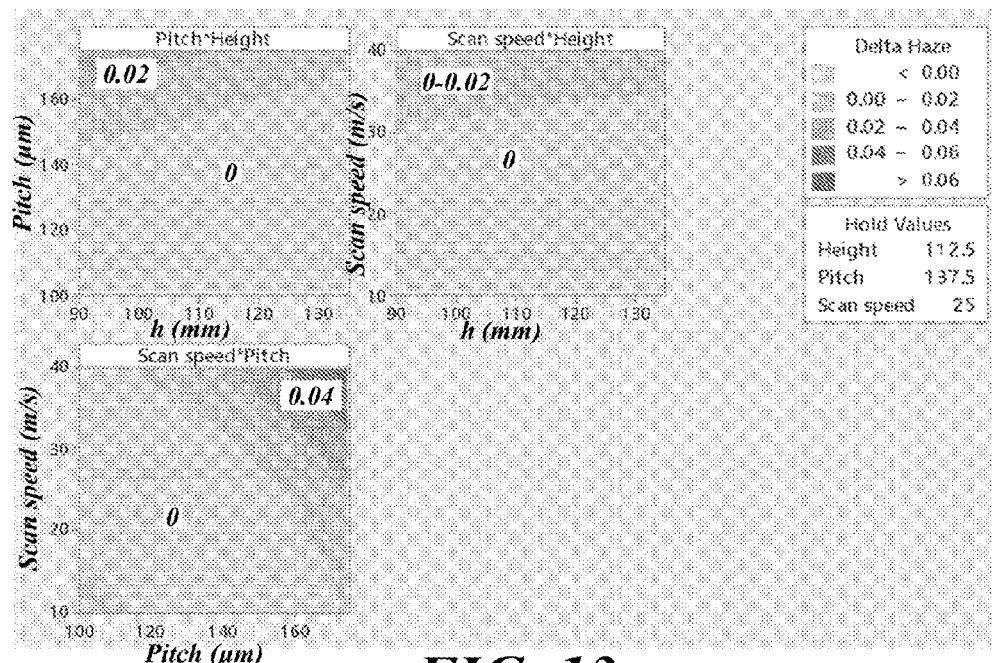
FIG. 13 includes contour plots of the change in haze due to a conductive layer as a function of pitch, scan speed, and stage height.

The change in ITO thickness does not correspond to degradation of the ITO. FIG. 13 illustrates the change in haze as a function of the same variables. Samples with residual metal coating layer were excluded from the haze measurements. For example, at large pitch and low spot energy, some residual metal coating layer remained in some cases. The changes to the haze are negligibly small and are thought to correspond to conditions likely to have some minor residual metals present. Thus, ITO thickness changes can be controlled to a relatively large extent without negatively affecting haze.

In some applications a change in ITO thickness is not problematic, and in other applications it can have significant optical consequences. In the case of an electrochromic mirror in which a large dynamic range and/or a fast switching speed is desired, for example, ITO removal can be problematic. The speed of darkening of the mirror is affected by the sheet resistance of the ITO such that removal of some of the ITO will increase the sheet resistance and slow the darkening of the mirror. In other cases, the dark state reflectance is a function of the optical thickness of the ITO with a half-wave thickness being preferred. If the initial thickness before the coating layer 14 is removed is a half wave then the resultant optical thickness will be less, thus increasing the reflectance of the dark state.

The challenges are further compounded when the color of the system of layers over the ITO is critical. For example, the reflected b* of a chrome or so-called gamma stack (Cr/Ru/Cr/Ru) on top of ITO is directly related to the thickness of the ITO. A neutral b* value is attained at about 80% of a half-wave thickness. In such a case, the initial ITO thickness cannot be increased to accommodate potential loss due to ablation because where the full thickness of the ITO remains at the unablated coating layer, the ITO will be too thick and affect the appearance of the mirror. The difference in thickness between the conductive layer (e.g., TCO or ITO) at the ring or unablated area (see border 38 of FIG. 6) and the conductive layer at the ablated area is preferably less than about 13%, more preferably less than about 8% and most preferably less than about 5%, where the percentage is the difference divided by the thickness at the unablated area.

The ablated area achieved using the techniques described herein have been shown to be functionally indistinguishable from an unablated surface for many quality metrics such as haze or thickness change. Other metrics such as absorption or bulk resistance may differ by a small amount, but under appropriate ablation conditions do not differ enough to significantly affect the functioning of an electrochromic (EC) device. However, while the several benefits of laser ablation described above may be realized without detriment to common quality metrics, certain new unexpected problems have been discovered, such as diffraction or refraction patterns that appear when light is shone on or through the ablated surface. This problem and some solutions are described in U.S. Provisional Patent Application Nos. 62/030,498 and 62/068,140 filed on Jul. 29, 2014 and Oct. 24, 2014, respectively. These applications are incorporated by reference in their entirety.

In the case of an electro-optic device, such as an EC mirror, this diffraction problem is observed most significantly when the device is in the darkened state and a point light source is imaged. The effect can also be observed in the clear, undarkened state in some cases. The undesirable effect is the appearance of a series of colored lines or artifacts noticeable around the area of the point light source. This is particularly relevant to rearview mirrors in automotive application since this condition is a principle function of the device.

A method of quantifying the severity of the effect has been developed to allow for ranking and improvements (i.e., reductions in appearance or noticeability) of the effect. In some cases, the diffraction effect is not present at all, which may be preferable. In other cases, the effect may be present but not with a severity that is objectionable. Lighting conditions and environmental factors can contribute to whether the effect is noticeable in real world conditions and whether it is objectionable.

A laboratory apparatus was developed for use as a research tool or quality control device to ensure that the diffraction effect is not present or is within defined acceptable limits. The device includes a point light source, such as an optical fiber with a light-emitting end. The light is projected toward the surface to be evaluated at a selected angle. A color camera is located at the complementary angle to the surface and images the result. The light detected by the camera is separated into the principle colors. A software algorithm then analyzes the image and determines an ellipse that can encompass the reflected image and define the analysis area. The area may scale with the severity of the diffraction effect wherein a more severe diffraction effect has a larger area. The area is analyzed and yellow light is subtracted from the image. The red, blue and green intensities are then summed and normalized to the analysis area. This then gives a quantitative metric for the severity of the diffraction effect which may be referred to as diffraction severity, where higher values for diffraction severity indicate a more severe, noticeable, and/or visually objectionable diffraction effect and lower values indicate a less severe, noticeable, and/or visually objectionable effect.

The diffraction severity values can be correlated to subjective objectionability by a particular observer or group of observers, type of light, angle of view, relative and absolute distances between an observer and the ablated surface and the light source, and/or other variables so that diffraction severity values obtained under a set of standardized conditions can be used to identify an acceptance threshold value. Or the diffraction severity values can be used as below to evaluate changes in the severity of the diffraction effect for experimental purposes.

prepared. In the first set, a chrome layer was ablated from glass and ITO was subsequently applied over one half of the ablated surface. In the second set, a chrome layer was applied over one half of an ITO-coated glass substrate then ablated.

Table I below lists the electro optical properties for the first set (ablation of metal off of glass). The table is divided into three sections. The first section lists the characteristics after ablation and subsequent ITO coating, the second section lists characteristics after ablation for the glass substrate without the application of an ITO coating, and the third section lists the difference in haze between the first and second sections. Each section of the table lists characteristics for trials A7-D7. Among the 4 trials, scan speed and pitch were held constant, while height changed for each trial in a range from 90-150 mm—i.e., the focal plane was moved with respect to the ablated surface within a range of 60 mm among the 4 trials. The data reported in Table I include the scan speed (m/s), pitch (µm), height (mm), transmittance (%), reflectance (%), absorbance (%), transmission haze (%), ITO sheet resistance (Ω), bulk resistivity (µΩ-cm), surface roughness (nm), ITO thickness excluding surface roughness (nm), total ITO thickness including surface roughness (nm), and refractive index of the ITO.

TABLE I

| | | | | | | | | Post Ablation and ITO Coating | | | | | |
|---|---|---|---|---|---|---|---|---|---|---|---|---|---|
| Trial | Scan Speed (m/s) | Pitch (µm) | Height (mm) | Transmittance (%) | Reflectance (%) | Absorbance (%) | Haze (%) | ITO Sheet Resistance (Ω) | Bulk Resistivity (µΩ-cm) | ITO Roughness (nm) | ITO Thickness w/o Roughness (nm) | Total ITO Thickness (nm) | ITO Refractive Index |
| A7 | 20 | 100 | 150 | 85.0 | 12.2 | 2.8 | 0.24 | 20.3 | 238 | 8.5 | 107.2 | 115.7 | 1.567 |
| B7 | 20 | 100 | 130 | 85.3 | 12.0 | 2.6 | 0.08 | 16.7 | 194 | 7.9 | 108.4 | 116.3 | 1.850 |
| C7 | 20 | 100 | 110 | 85.4 | 12.1 | 2.4 | 0.08 | 17.5 | 207 | 7.6 | 110.9 | 118.5 | 1.869 |
| D7 | 20 | 100 | 90 | 85.4 | 12.2 | 2.4 | 0.08 | 17.6 | 202 | 6.1 | 108.9 | 115.0 | 1.870 |

| | | | | Post Ablation | | | | | |
|---|---|---|---|---|---|---|---|---|---|
| Trial | Scan Speed (m/s) | Pitch (µm) | Height (mm) | Transmittance (%) | Reflectance (%) | Absorbance (%) | Haze (%) | Trial | Haze Difference (%) |
| A7 | 20 | 100 | 150 | 90.8 | 8.3 | 0.8 | 0.08 | A7 | 0.16 |
| B7 | 20 | 100 | 130 | 90.9 | 8.3 | 0.8 | 0.06 | B7 | 0.02 |
| C7 | 20 | 100 | 110 | 90.8 | 8.3 | 0.9 | 0.08 | C7 | 0.00 |
| D7 | 20 | 100 | 90 | 91.0 | 8.3 | 0.8 | 0.09 | D7 | 0.02 |

The numbers generated using this technique were used to select a range of samples with different severity levels. The samples were reviewed in both laboratory and drive conditions, and subjectively ranked to determine threshold values. The age of the observer, vehicle type and drive route all affected the rankings. The diffraction severity rating from the particular instrument described above should be less than about 5, preferably less than about 2.5 and most preferably less than about 1.5. The visibility of the effect under the most stringent lighting conditions starts at diffraction severity values of about 0.7 to 1.0.

A series of samples were created with varying laser ablation settings to create a range of diffraction severity values. The samples were then subjected to a series of surface science characterization methods to determine what is changing which creates the effect but which is invisible to the standard quality metrics. Two sets of samples were prepared.

Table I supports the observation that the glass is of high quality after ablation and that the addition of the ITO to the ablated glass does not result in properties which are abnormal. The height for focus for these experiments was approximately 90 mm, which is different from that of the other experiments described above which will shift the effective working height slightly. The relative heights can be calculated from the heights listed in the tables.

Table II below lists the electro optical properties for the second set (ablation of metal off of ITO). The table is divided into three sections. The top section lists the characteristics of the ITO surface after ablation, the middle section lists characteristics of the unablated ITO surface, and the bottom section lists the difference in certain characteristics between the top and middle sections. Each section of the table lists characteristics for trials E7-H7. Among the 4 trials, scan speed and pitch were held constant, while height changed for each trial in a range from 90-150 mm.

TABLE II

| Trial | Scan Speed (m/s) | Pitch (μm) | Height (mm) | Trans-mittance (%) | Reflec-tance (%) | Absorbance (%) | Haze (%) | Sheet Resistance (Ω) | Bulk Resistivity (μΩ-cm) | Roughness (nm) | Thickness w/o Roughness (nm) | Total Thickness (nm) | Refractive Index |
|---|---|---|---|---|---|---|---|---|---|---|---|---|---|
| Ablated Surface | | | | | | | | | | | | | |
| E7 | 20 | 100 | 150 | 86.0 | 11.3 | 2.7 | 0.09 | 13.9 | 164 | 4.7 | 113.2 | 117.8 | 1.367 |
| F7 | 20 | 100 | 130 | 84.8 | 12.4 | 2.8 | 0.08 | 15.1 | 173 | 5.7 | 108.7 | 114.5 | 1.870 |
| G7 | 20 | 100 | 110 | 83.4 | 14.0 | 2.6 | 0.08 | 16.8 | 177 | 6.7 | 98.7 | 105.4 | 1.576 |
| H7 | 20 | 100 | 90 | 82.5 | 15.0 | 2.5 | 0.09 | 18.3 | 182 | 5.0 | 94.5 | 99.5 | 1.369 |
| Unablated Surface | | | | | | | | | | | | | |
| E7 | 20 | 100 | 150 | 86.3 | 11.0 | 2.1 | 0.07 | 13.9 | 164 | 4.3 | 118.9 | 118.2 | 1.849 |
| F7 | 20 | 100 | 130 | 86.8 | 11.0 | 2.2 | 0.07 | 14.0 | 167 | 4.6 | 114.5 | 119.1 | 1.843 |
| G7 | 20 | 100 | 110 | 86.5 | 11.4 | 2.1 | 0.06 | 14.6 | 171 | 4.5 | 112.6 | 117.1 | 1.344 |
| H7 | 20 | 100 | 90 | 86.9 | 11.0 | 2.1 | 0.07 | 14.0 | 171 | 6.3 | 115.4 | 122.2 | 1.843 |

Difference Post Ablation

| Trial | Absorbance (%) | Haze | Sheet Resistance (Ω) | Bulk Resistivity (μΩ-cm) | Roughness (nm) | Thickness w/o Roughness (nm) | Total Thickness (nm) | Refractive Index |
|---|---|---|---|---|---|---|---|---|
| E7 | 0.5 | 0.02 | 0.0 | 1 | 0.3 | −0.7 | −0.4 | 0.018 |
| F7 | 0.6 | 0.01 | 1.1 | −6 | 1.1 | −6.8 | −4.6 | 0.027 |
| G7 | 0.5 | 0.02 | 2.2 | −6 | 2.2 | −13.9 | −11.7 | 0.032 |
| H7 | 0.4 | 0.02 | 4.3 | −11 | −1.8 | −20.9 | −22.6 | 0.026 |

In general, Table II supports the observation that the ITO is of high quality after ablation and that many of the listed characteristics remain relatively unchanged. The visible light absorption of the ITO from which the metal layer was ablated is about 0.6% higher than that of the ITO that did not experience ablation. The ITO thickness drops appreciably as the laser ablation process is moved to lower height—i.e., closer to focus and with a higher energy density at the laser spot. In some cases, the after-ablation ITO is slightly rougher and the bulk resistance is slightly higher than the non-ablated ITO.

The roughness values reported in Tables I and II were determined using ellipsometry. As noted above, the listed values and differences are not considered significant. An ellipsometer looks at small-scale features—smaller than a wavelength of light. As noted herein, the diffraction effect requires features on a longer length scale. The ellipsometer averages over these longer length scales and is not appreciably affected by the larger artifacts.

The diffraction effect requires features of a certain periodicity to be present on the surface. The period is approximately 45,000 nm in the scan or process path direction (direction A in FIG. 1) and 85,000 nm in the line offset direction (i.e., the pitch). Such periodicity may be caused either by uniformity in overlap among sequential laser spots of the same size in the scan direction and/or by the offset (pitch) of the scan lines. The general requirements for the diffraction effect is that the period is between about 4,500 nm and 850,000 nm. In an automotive rearview mirror application, the relative distances between the mirror, the driver, and the light source can affect the visibility of the effect and may change these limits somewhat.

There can be various permutations in the features, but a minimum requirement is that the feature has some structure to it. The experimental samples used to generate the values in Tables I and II were further analyzed using White-Light Interferometry (WLI) to quantify the relationship between the optical diffraction effect and the structures present on the ablated surfaces. The WLI looked over a broader area to reveal the periodicity of the structure that creates the diffraction effect. Table III shows the results of the WLI analysis along with some additional data. FIGS. 18-29 are WLI images associated with respectively listed sample types A7 through H7M of Table III. Peak-to-valley values are in nanometers and are measured in the thickness direction (vertical direction in FIGS. 18-29).

The diffraction effect was measured using the camera imaging technique described above. Since in one intended application (i.e., automotive electrochromic (EC) rearview mirror) the ablated surface is viewed through the glass, the effect was measured in a comparable orientation with the measurement taken through the thickness of the glass with the ablated surface as the second surface with air as the exit medium. These measurements are listed in Table III as "Diffraction Severity Air." The diffraction effect was also measured in a comparable orientation while wetted with a liquid having a refractive index higher than air, approximately 1.44 in this case, and reported in Table III as "Diffraction Severity Wetted." The peak-to-valley heights of the periodic features were measured using WLI in a local area to minimize effects of large scale non-flatness of the substrate.

TABLE III

| Sample | Treatment | Final State | Scan Speed (m/s) | Pitch (μm) | Height (mm) | Diffraction Severity Air | Diffraction Severity Wetted | Peak-to-Valley (nm) |
|---|---|---|---|---|---|---|---|---|
| A7 | Metal Ablation off Glass | Glass + ITO overcoat | 20 | 100 | 150 | 0.09 | 0.30 | 32.2* |

TABLE III-continued

| Sample | Treatment | Final State | Scan Speed (m/s) | Pitch (μm) | Height (mm) | Diffraction Severity Air | Diffraction Severity Wetted | Peak-to-Valley (nm) |
|---|---|---|---|---|---|---|---|---|
| A7M | Metal Ablation off Glass | Glass | 20 | 100 | 150 | 0.50 | 0.00 | 7.10 |
| B7 | Metal Ablation off Glass | Glass + ITO overcoat | 20 | 100 | 130 | 1.00 | 0.04 | 7.10 |
| B7M | Metal Ablation off Glass | Glass | 20 | 100 | 130 | 0.15 | 0.00 | 6.20 |
| C7 | Metal Ablation off Glass | Glass + ITO overcoat | 20 | 100 | 110 | 5.50 | 1.20 | 9.60 |
| C7M | Metal Ablation off Glass | Glass | 20 | 100 | 110 | 1.50 | 0.06 | 8.80 |
| D7 | Metal Ablation off Glass | Glass + ITO overcoat | 20 | 100 | 90 | 9.60 | 2.10 | 14.80 |
| D7M | Metal Ablation off Glass | Glass | 20 | 100 | 90 | 4.80 | 0.15 | 14.00 |
| E7 | Metal Ablation off ITO | Glass/ITO | 20 | 100 | 150 | 2.80 | 0.54 | 8.90 |
| E7M | Laser Pass Through | Glass/ITO | 20 | 100 | 150 | 0.35 | 0.45 | 3.20 |
| F7 | Metal Ablation off ITO | Glass/ITO | 20 | 100 | 130 | 3.20 | 0.23 | 11.60 |
| F7M | Laser Pass Through | Glass/ITO | 20 | 100 | 130 | 0.39 | 0.23 | 3.30 |
| G7 | Metal Ablation off ITO | Glass/ITO | 20 | 100 | 110 | 3.70 | 0.95 | 10.60 |
| G7M | Laser Pass Through | Glass/ITO | 20 | 100 | 110 | 0.40 | 0.45 | 3.10 |
| H7 | Metal Ablation off ITO | Glass/ITO | 20 | 100 | 90 | 4.20 | 1.10 | 14.10 |
| H7M | Laser Pass Through | Glass/ITO | 20 | 100 | 90 | 0.32 | 0.45 | 3.40 |

*measurement artifact

In the bottom half of TABLE III, the E7M, F7M, G7M and H7M samples are reference controls which did not have metals ablated from the ITO. These samples show that, for the case where ITO is present, the coating itself has an average diffraction severity reading of about 0.365 and an average peak to valley distance of about 3.2. These values can be viewed as the baseline noise levels for these conditions, as there is no periodicity or structure since the roughness is random.

Figure 14:
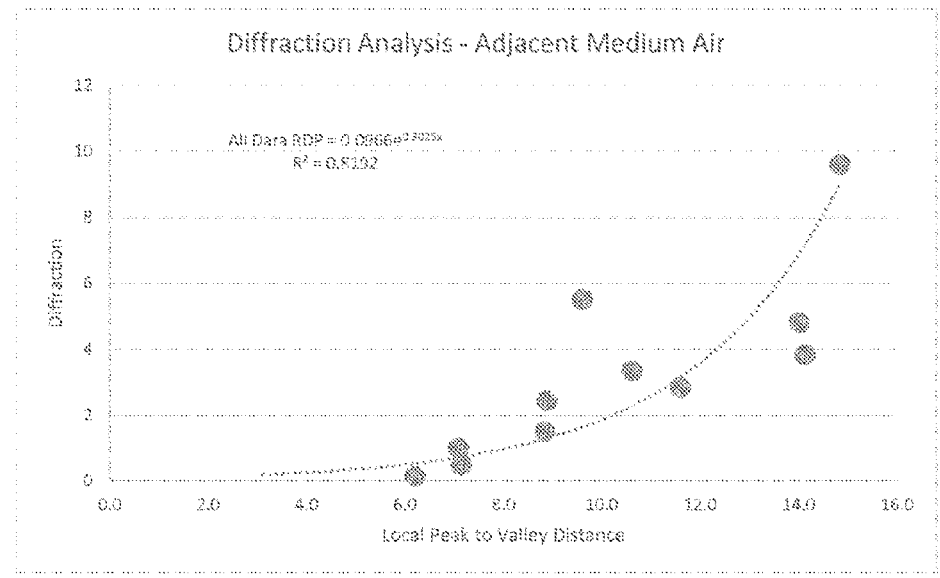
FIG. 14 is a plot of diffraction severity as a function of peak-to-valley dimensions of features of a periodic structure formed by laser ablation.

The overall relationship between the diffraction severity readings and the peak-to-valley distance is shown in FIG. 14, where the three different cases from Table III are combined: ablation of metal off of glass, ablation of metal off of glass with an ITO overcoat, and ablation of metal off of ITO. It should be noted that the different refractive indices of the materials and adjacent media will combine to alter the intensity of the diffraction effect. In order to attain a diffraction severity number lower than about 5 with air as the adjacent media, the peak-to-valley distance should be less than about 15 nm, preferably less than about 10 nm, and most preferably less than about 7.5 nm.

Figure 15:
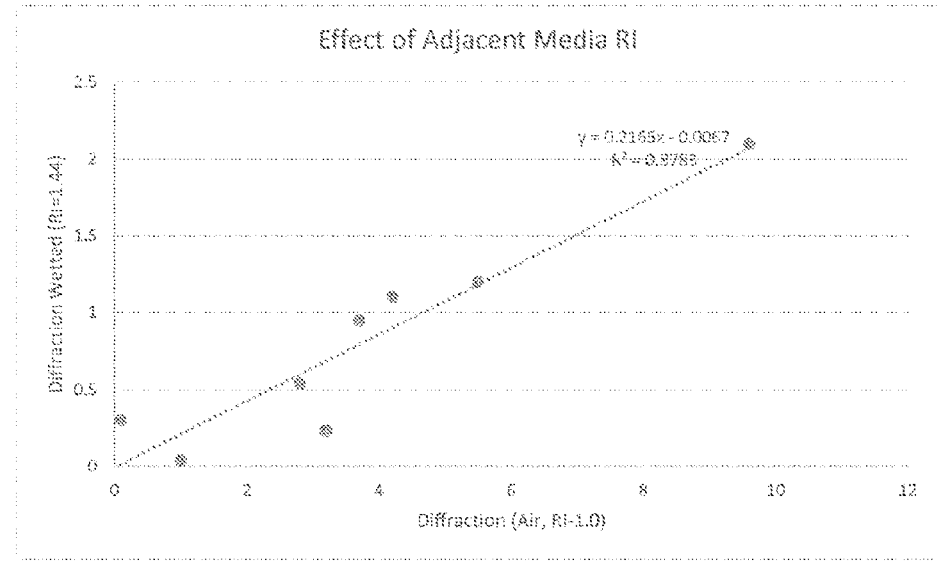
FIG. 15 is a plot of diffraction severity of a periodic structure when wetted as a function of the diffraction severity when not wetted.

The adjacent medium plays a significant role in the intensity of the diffraction effect. FIG. 15 illustrates the relationship between the diffraction severity readings with air as the adjacent medium and with a liquid having a refractive index of 1.44 as the adjacent medium. The diffraction severity values of the wetted condition are approximately 20% of the diffraction severity values with air in this example.

Figure 16:
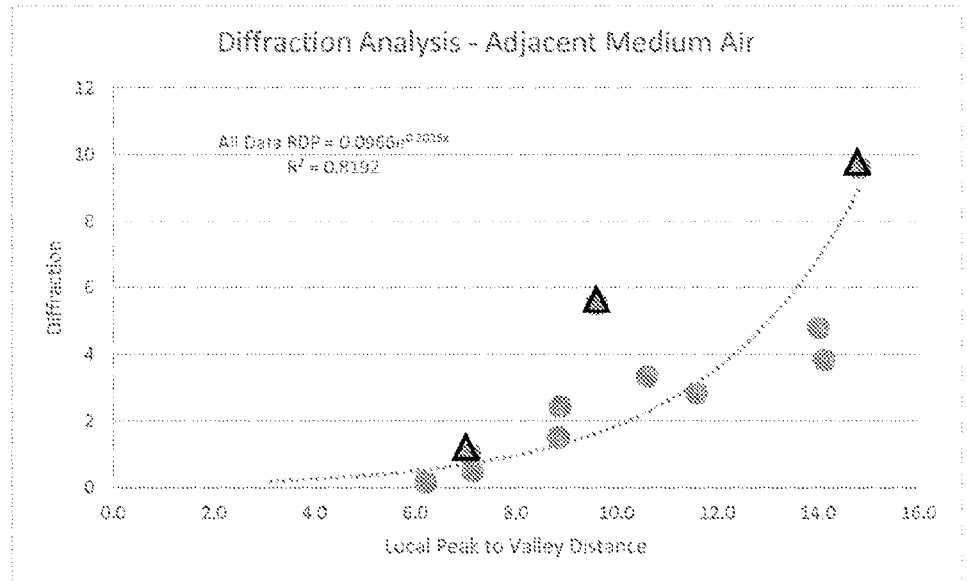
FIG. 16 is the plot of FIG. 14 with certain data points highlighted.

The role of the refractive index is further highlighted in FIG. 16. The samples with ITO deposited over the ablated glass surface are represented with triangular data points. In this case the ITO has a higher refractive index and the diffraction severity readings are relatively large for the peak-to-valley metric.

Figure 17:
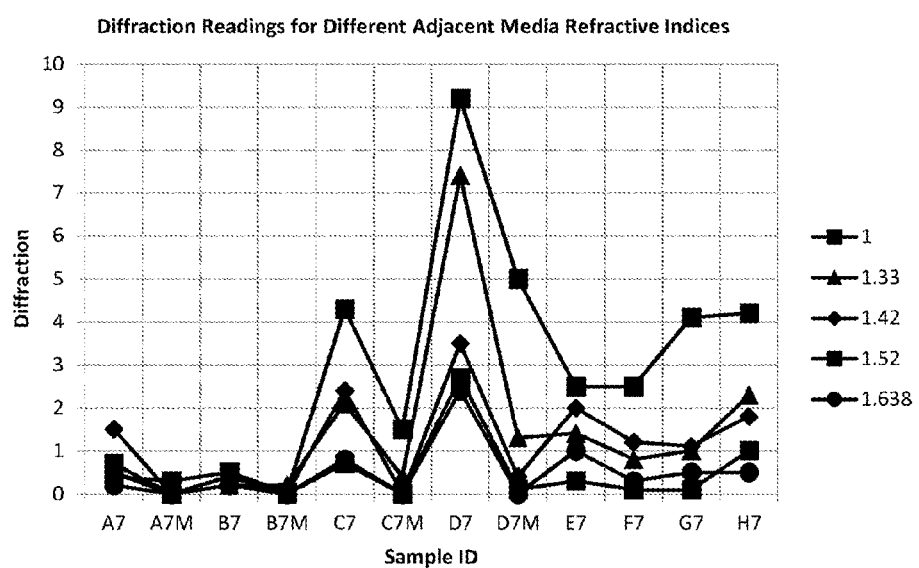
FIG. 17 is a chart illustrating diffraction severity for multiple samples fabricated under multiple different conditions.
Figure 18:
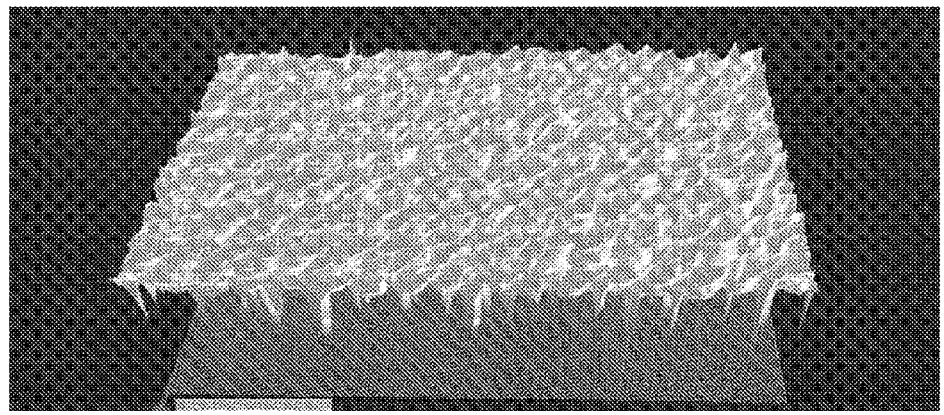
FIG. 18 is a white-light interferometry (WLI) image of sample A7 of FIG. 17.
Figure 19:
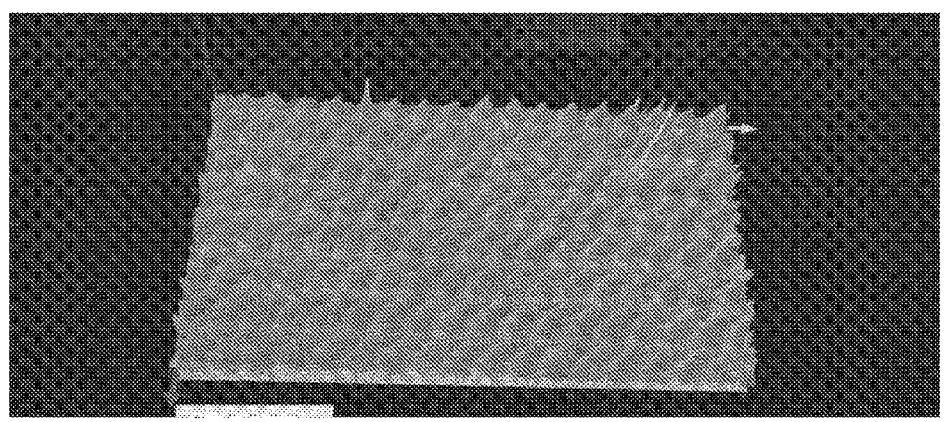
FIG. 19 is a white-light interferometry (WLI) image of sample A7M of FIG. 17.
Figure 20:
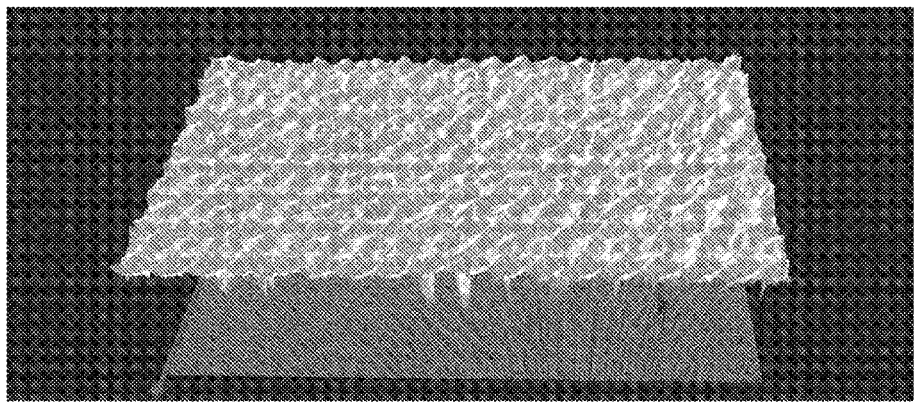
FIG. 20 is a white-light interferometry (WLI) image of sample B7 of FIG. 17.
Figure 21:
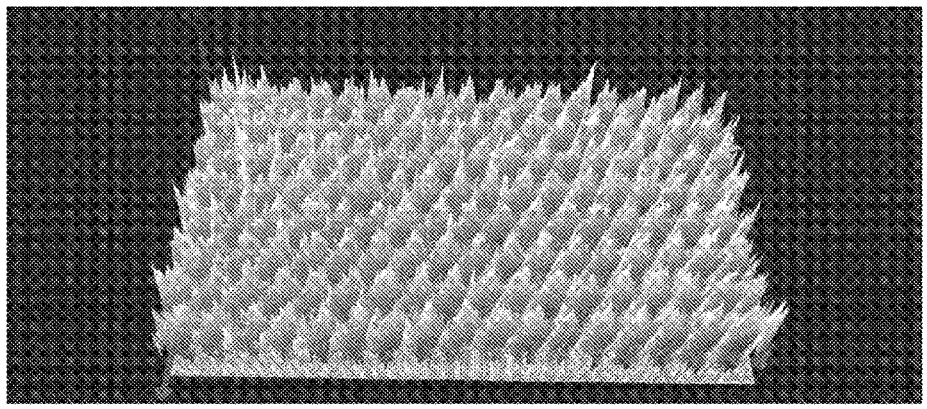
FIG. 21 is a white-light interferometry (WLI) image of sample B7M of FIG. 17.
Figure 22:
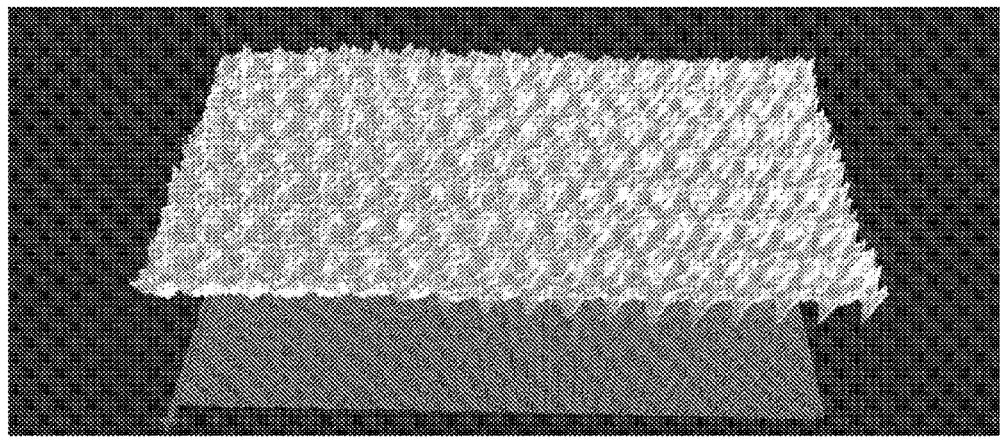
FIG. 22 is a white-light interferometry (WLI) image of sample C7 of FIG. 17.
Figure 23:
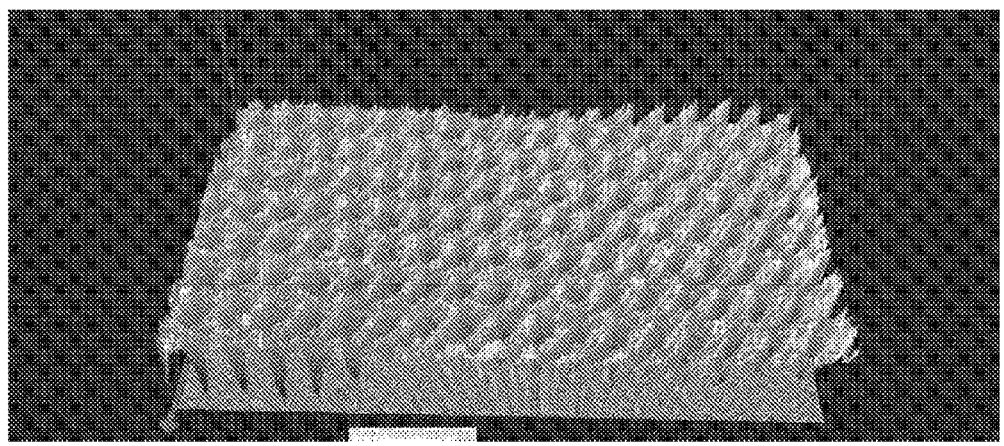
FIG. 23 is a white-light interferometry (WLI) image of sample C7M of FIG. 17.
Figure 24:
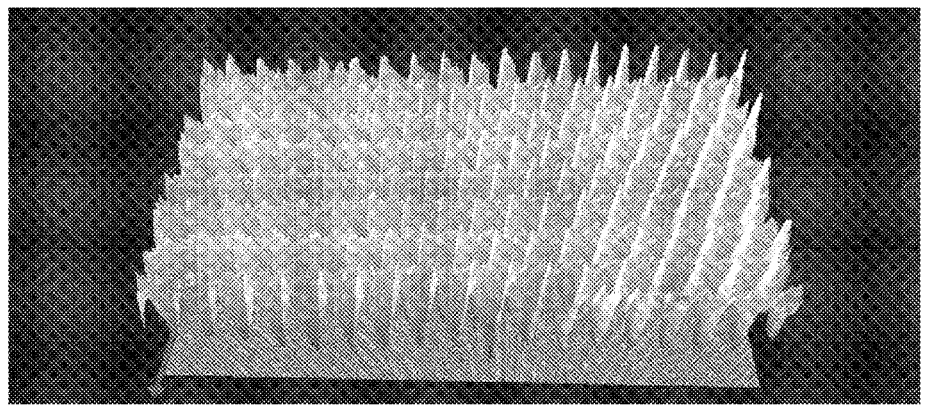
FIG. 24 is a white-light interferometry (WLI) image of sample D7 of FIG. 17.
Figure 25:
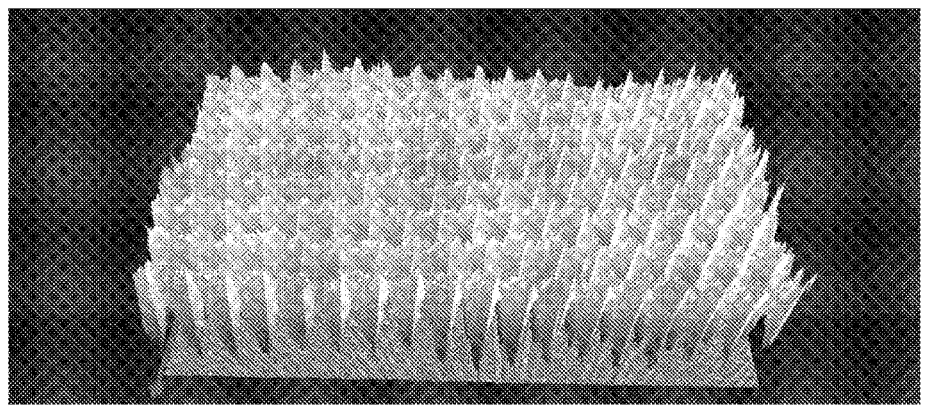
FIG. 25 is a white-light interferometry (WLI) image of sample D7M of FIG. 17.
Figure 26:
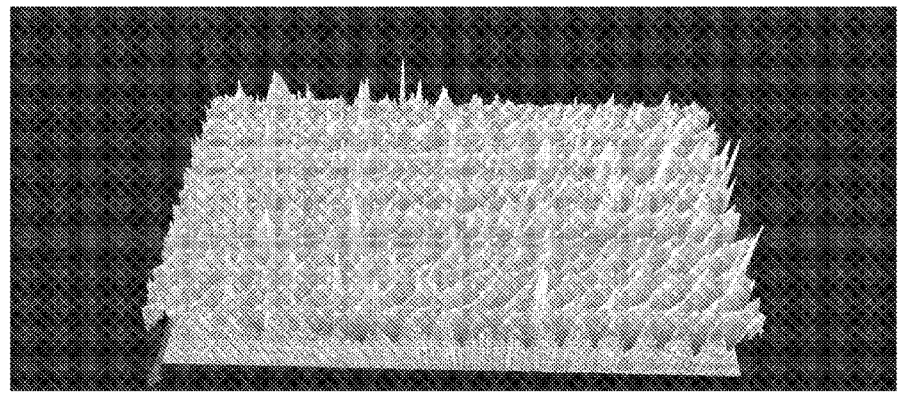
FIG. 26 is a white-light interferometry (WLI) image of sample E7 of FIG. 17.
Figure 27:
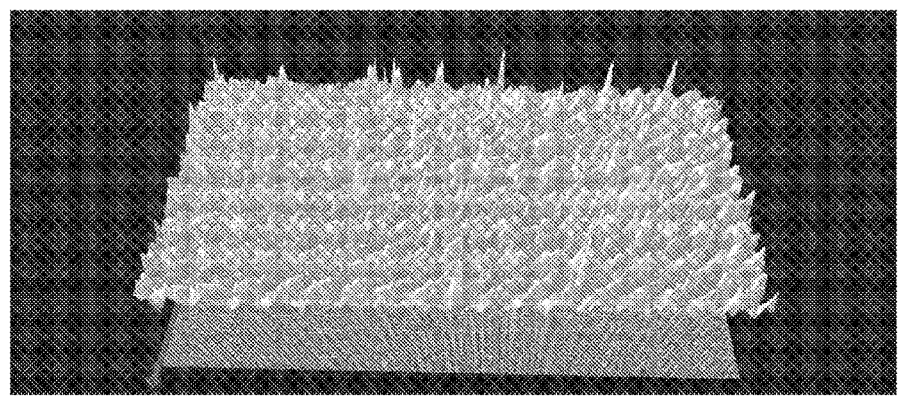
FIG. 27 is a white-light interferometry (WLI) image of sample F7 of FIG. 17.
Figure 28:
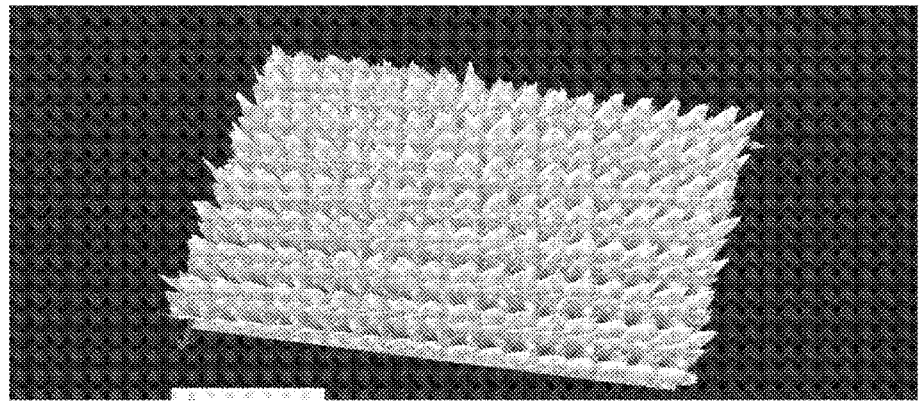
FIG. 28 is a white-light interferometry (WLI) image of sample G7 of FIG. 17.
Figure 29:
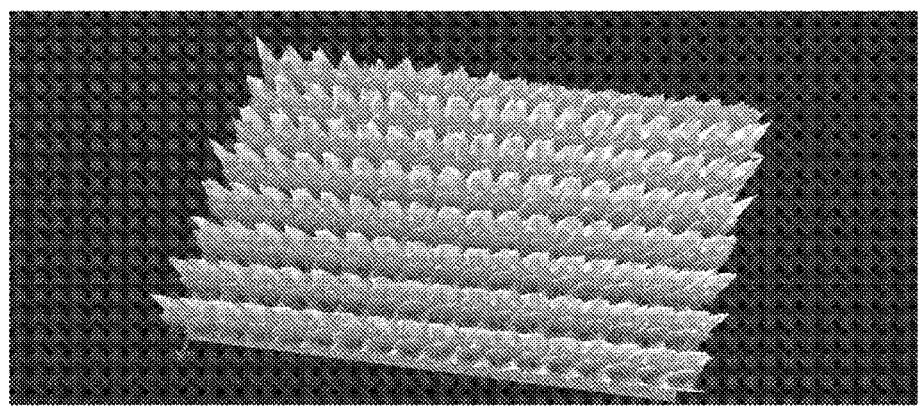
FIG. 29 is a white-light interferometry (WLI) image of sample H7 of FIG. 17.

FIG. 17 further explores the role of the refractive index of the adjacent medium. The data in FIG. 17 is for diffraction severity readings for samples in Tables I and II taken through the glass with liquids having various refractive indices wetted to the ablated surface with the resultant features which give rise to the diffraction effect. The ITO-only, E7M, F7M, G7M, and H7M samples are not included since they do not have a periodic structure which causes the diffraction effect. FIG. 17 indicates that a decrease in the difference in the refractive index between the adjacent medium and the surface with the periodic damage decreases the diffraction effect. As shown in Table II above, the refractive index of ITO is about 1.85. An adjacent medium having a refractive index greater than 1 and closer to the refractive index of the surface with the periodic damage than to 1 enables a greater peak-to-valley feature dimension before an objectionable diffraction effect is noticed when compared with air as the adjacent medium. When wetted, the peak-to-valley is preferably less than about 25 nm, more preferably less than about 18 nm, and most preferably less than about 13 nm. The difference in refractive index between the surface with the periodic damage and the adjacent media may be less than 0.5, such as less than 0.35, or less than 0.2.

Figure 30:
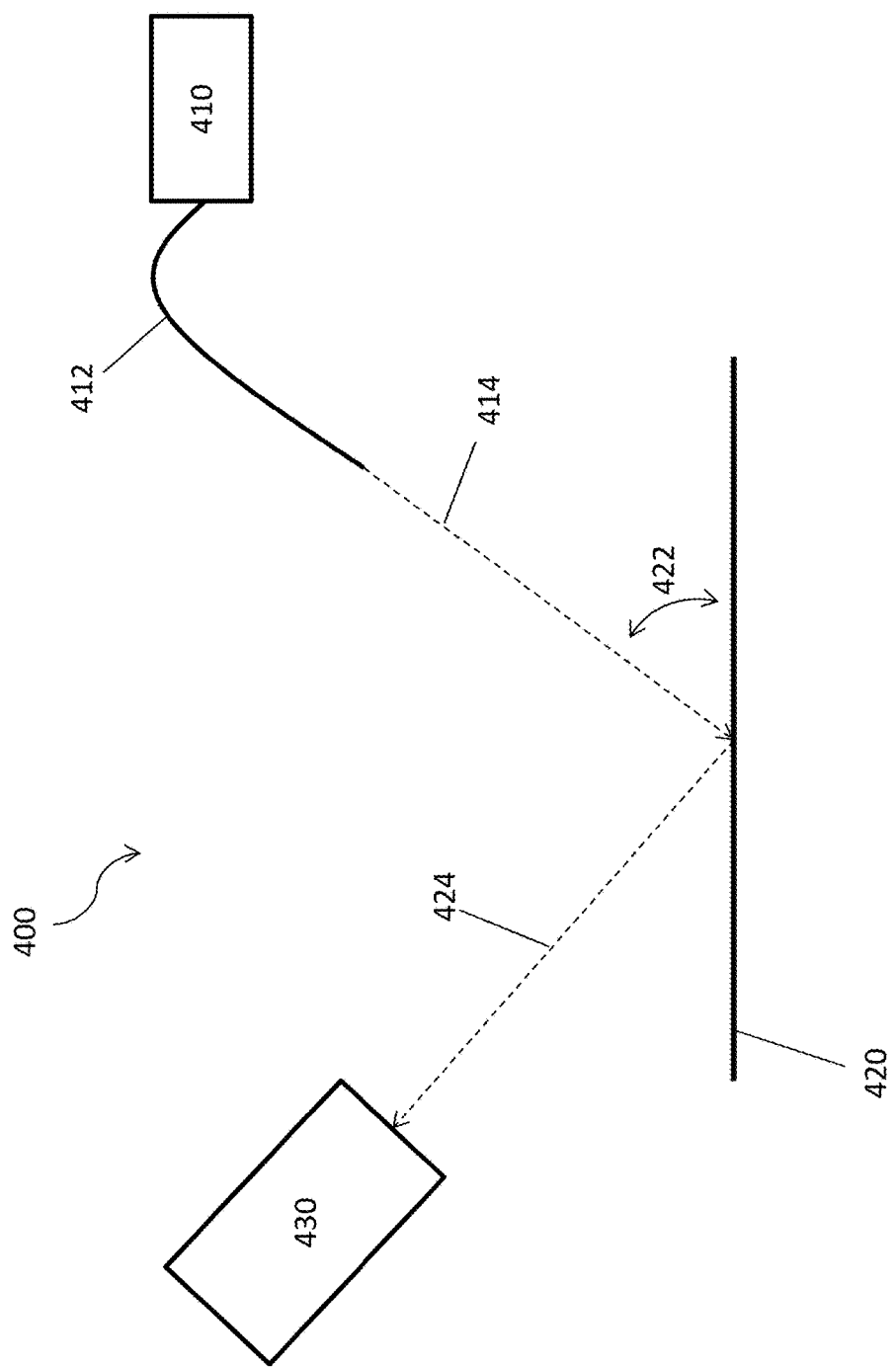
FIG. 30 is a schematic representation of a diffraction severity measurement system.

An exemplary diffraction severity measurement system 400 is depicted in FIG. 30. The system 400 includes a light source 410, a fiber optic cable 412, and a camera 430. The light source 410 produces light that is transmitted by the fiber optic cable 412 and then directed from the end of the fiber optic cable 412 toward a sample 420. The light 414 from the end of the fiber optic cable 412 impinges on the sample 420 at an angle 422, where the angle 422 is measured from the plane of the sample. A camera 430 is positioned to capture light 424 that forms a diffraction pattern produced by the sample 420. The system may be located in a dark room when measurements are taken, such that errors introduced by stray light are minimized.

The angle 422 at which the light impinges on the sample was 35°, as measured from the plane of the sample. The end of the fiber optic cable 412 was positioned at a distance of 17 inches from the sample 420. In the case where the end of the fiber optic cable 412 is too close to the sample 420, the camera 430 may pick up brighter background noise from the illumination cone rather than just the desired bright spot on the sample. The illumination area on the sample 420 was approximately 180 cm². The illumination area is selected to be large enough that the illumination makes little to no contribution to the image intensity measured by the camera 430. The camera 430 was positioned at distance of 17 inches from the sample at an angle comparable to the angle 422 at which the light impinges on the sample. The camera was a Basler model AC2500-14UC with an f1.8 aperture, and a 50 mm Fujinon lens, model # HF50SA-1. The focus of the lens was then adjusted so that the focal plane of the camera was at the same position as the end of the fiber optic cable 412.

Figure 31:
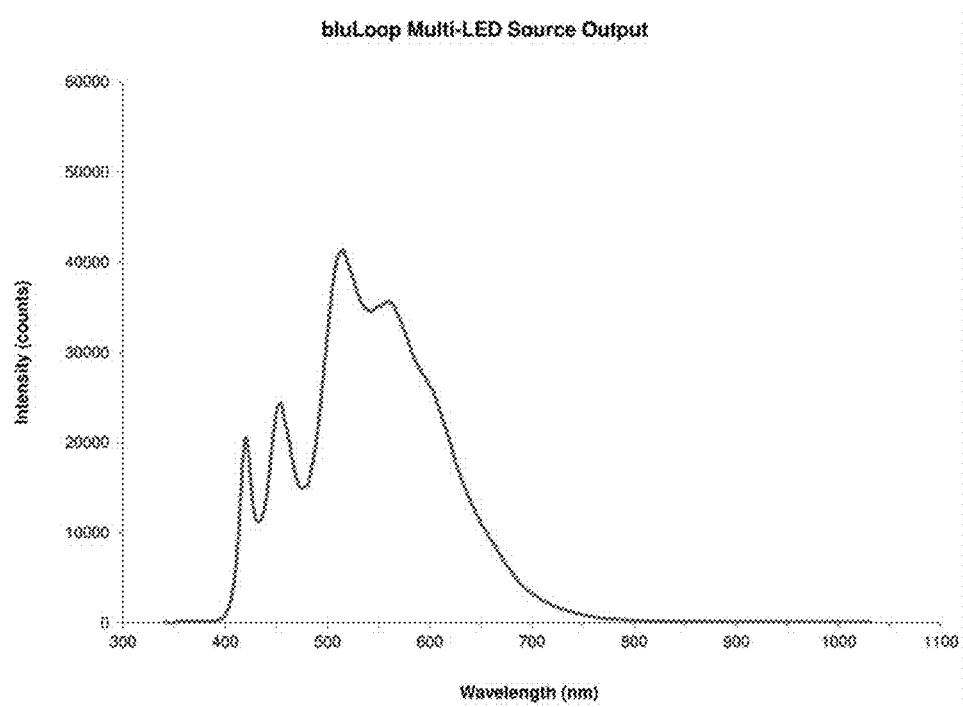
FIG. 31 is a light spectrum produced by a multi-LED light source.

The light source 410 may be any appropriate light source. In some embodiments, the light sources may be a multi-LED source. In the exemplary diffraction severity measurement system 400, the light source was an Ocean Optics bluLoop model that produced a light spectrum as shown in FIG. 31.

The camera employed a static exposure. The integration time was selected between two extremes. The integration time was short enough so that neither of the Red, Green or Blue colors were saturated, and the integration time was long enough so that the diffraction colors were perceptible above the noise level of the measurements. The difference between the two integration times defined the working integration time. The integration time may be set half way between these two values for adequate diffraction measurements. In the exemplary diffraction severity measurement system 400, the exposure time was set to approximately 50 milliseconds. The camera was calibrated to a spectralon plaque to attain a proper white balance. The Red, Green and Blue gains were adjusted as necessary for proper color of the spectralon plaque. The calibration process is well known by those skilled in the art.

Figure 32:
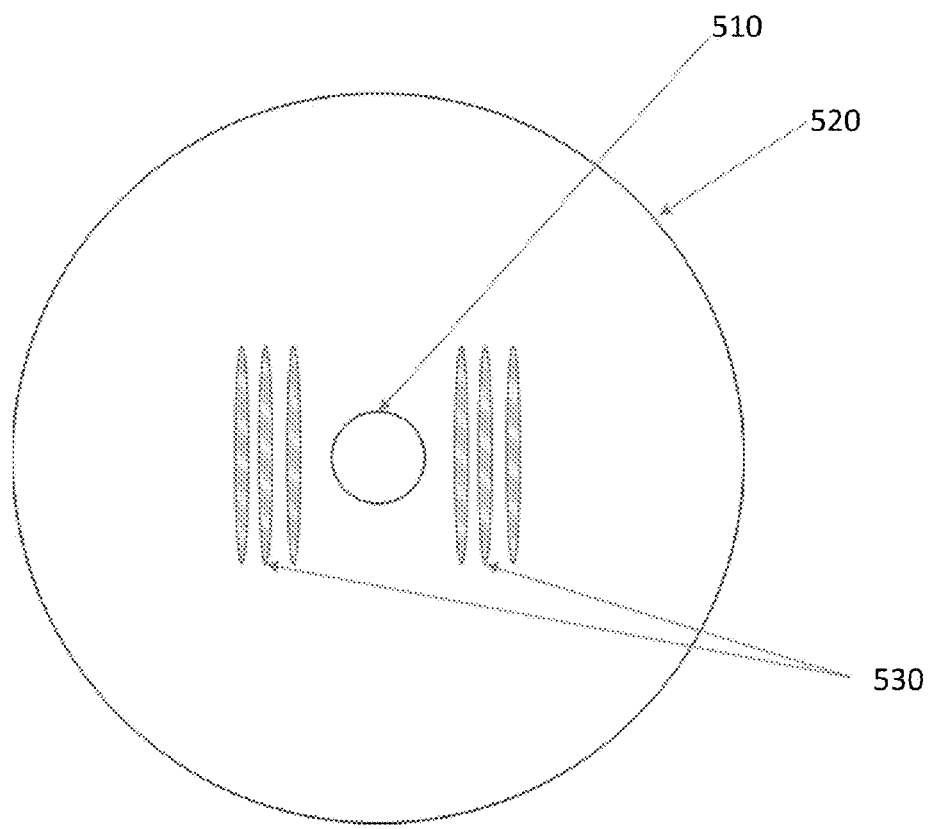
FIG. 32 is a schematic representation of an analysis area, exclusion zone, and diffraction color bands of a diffraction severity measurement system.
Figure 33:
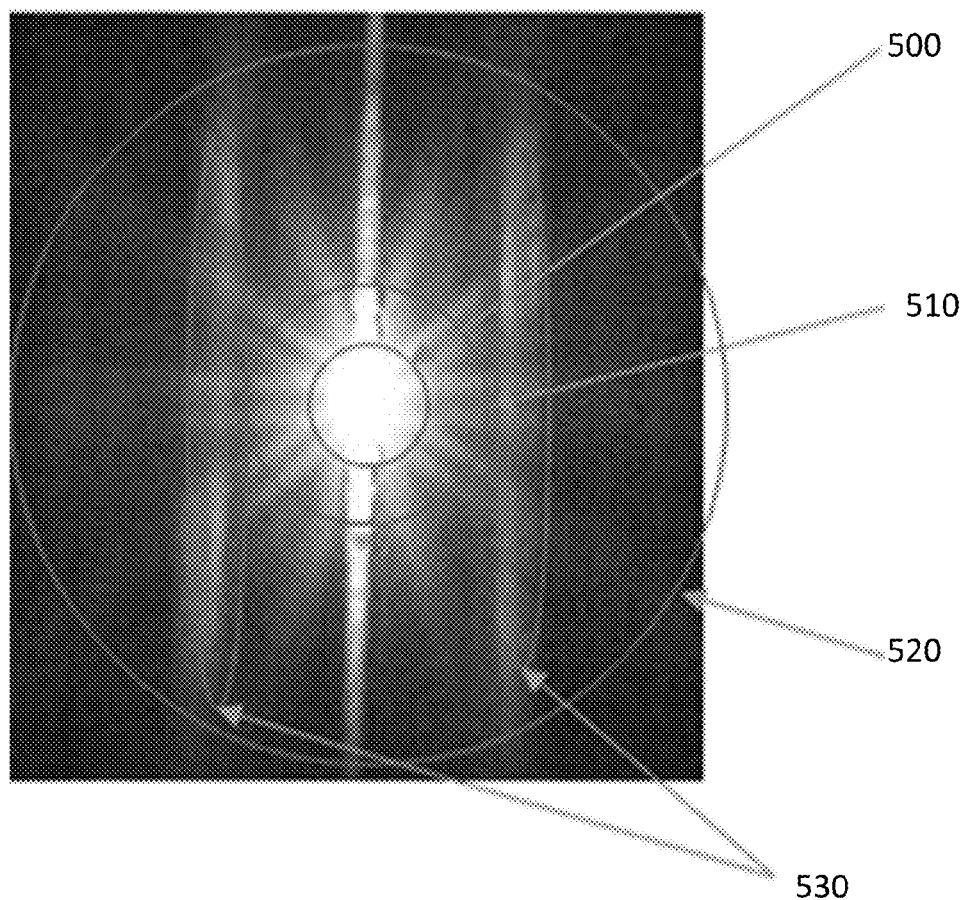
FIG. 33 is a camera image of the diffraction effect with an overlay of the center bright spot 500, exclusion zone 510, analysis area 520, and color diffraction bands 530 from a diffraction severity measurement system.

A schematic representation of the camera image analysis is shown in FIG. 32. The image is broken down into two regions—an exclusion zone 510 and an analysis area 520. The diameter of each region is based on the size of the bright light source in the center of the image. The diameter of the center bright spot is measured, and the exclusion zone 510 has a diameter that is twice the center bright spot diameter. The analysis area 520 has a diameter that is six times the diameter of the center bright spot. As shown in FIG. 32, the exclusion zone 510 and the analysis area 520 are concentric with the center bright spot. The analysis image is evaluated for vertical color diffraction bands 530 on both sides of the center bright spot that are located in the "donut" region between the exclusion zone 510 and the analysis area 520 border. FIG. 33 shows a camera image of the diffraction effect with an overlay of the center bright spot 500, exclusion zone 510, analysis area 520, and color diffraction bands 530.

The color diffraction bands 530 were then examined for regions which are comprised essentially of Red, Blue or Green light. These regions define the diffraction bands 530. The area was calculated for each of these colors, and then summed. The total area of the diffraction bands 530 is then divided by the total analysis area to obtain a unit-less diffraction severity associated with the diffraction effect.

As the magnitude of diffraction effect increases and decreases the area of the Red, Blue and Green zones changes proportionally. The number of diffraction zones may increase or the width and length of the zones may change as the magnitude of the effect varies. The diffraction severity measurement system provides a means to capture the different ways the severity of the diffraction effect may vary. Because the diffraction severity measurement system utilizes area ratios, it is relatively insensitive to the integration time. For example, the resultant diffraction severity values may change by only about ±5% with a change of approximately ±25% of the working integration time.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A product, comprising:
   a first substrate that is at least partially transparent to visible light;
   a conductive layer disposed over the first substrate; and
   an ablated surface on the conductive layer,
   wherein the ablated surface is formed by subjecting the conductive layer to laser ablation, the ablated surface comprises a periodic structure, the periodic structure has a period in at least one direction of 4,500 nm to 850,000 nm, and the periodic structure has a peak-to-valley dimension of less than 25 nm.

2. The product of claim 1, wherein the periodic structure has a peak-to-valley dimension of less than 15 nm.

3. The product of claim 1, wherein the periodic structure has a period in a laser ablation process direction of 4,500 nm to 850,000 nm.

4. The product of claim 1, wherein the periodic structure has a period in a laser ablation offset direction of 4,500 nm to 850,000 nm.

5. The product of claim 1, wherein the product has a diffraction severity of less than 5.

6. The product of claim 1, wherein the substrate comprises glass.

7. The product of claim 1, further comprising a material in contact with the periodic structure, wherein the material has a refractive index greater than 1, and a difference between the refractive index of the material and a refractive index of the conductive layer is less than 0.5.

8. The product of claim 1, wherein the conductive layer comprises indium tin oxide.

9. The product of claim 1, further comprising a coating layer disposed on a portion of the conductive layer.

10. The product of claim 9, wherein the coating layer comprises a multilayer structure comprising a first chrome layer, a first ruthenium layer, a second chrome layer, and a second ruthenium layer.

11. The product of claim 1, wherein the product has a diffraction severity of less than 5, and the peak-to-valley dimension is less than 15 nm.

12. The product of claim 11, wherein the diffraction severity is less than 2.5.

13. The product of claim 12, wherein the diffraction severity is less than 1.5.

14. An electrochromic device, comprising:
a product comprising:
   a first substrate that is at least partially transparent to visible light;
   a conductive layer disposed over the first substrate; and
   an ablated surface on the conductive layer,
   wherein the ablated surface is formed by subjecting the conductive layer to laser ablation, the ablated surface comprises a periodic structure, the periodic structure has a period in at least one direction of 4,500 nm to 850,000 nm, and the periodic structure has a peak-to-valley dimension of less than 25 nm;
a second substrate having a second surface that opposes the first substrate, the first and second substrates forming a cavity between the first substrate and the second substrate; and
an electrochromic fluid disposed in the cavity,
wherein at least one of the ablated surface and the second surface is adjacent the cavity, and at least one conductive layer is adjacent the cavity.

15. The electrochromic device of claim 14, wherein the electrochromic device is a part of a vehicle rearview mirror assembly.

16. The electrochromic device of claim 14, wherein the electrochromic fluid has a refractive index greater than 1.

* * * * *